(12) United States Patent
Knox

(10) Patent No.: US 6,775,364 B2
(45) Date of Patent: *Aug. 10, 2004

(54) METHOD AND APPARATUS FOR SELECTIVELY SENDING A FALSE SYSTEM INFORMATION TONE ON A TELEPHONE LINE

(75) Inventor: Bruce R. Knox, Kirtland Hills, OH (US)

(73) Assignee: Royal Appliance Mfg. Co., Glenwillow, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/108,587

(22) Filed: Mar. 27, 2002

(65) Prior Publication Data

US 2003/0185364 A1 Oct. 2, 2003

(51) Int. Cl.[7] .......................... H04M 15/06; H04M 1/56
(52) U.S. Cl. .......................... 379/142.01; 379/142.12; 379/142.13; 379/142.17; 379/188; 379/361
(58) Field of Search ...................... 379/142.01, 142.04, 379/142.06, 142.07, 142.12, 142.13, 142.17, 93.02, 93.05, 93.17, 70, 77, 81, 88.21, 188, 199, 200, 322, 324, 325, 361, 362, 373.01, 376.01, 377, 387.01, 399.01, 399.02, 433.04, 185

(56) References Cited

U.S. PATENT DOCUMENTS

| | | | |
|---|---|---|---|
| 4,802,202 A | | 1/1989 | Takahashi et al. |
| 5,029,198 A | * | 7/1991 | Walpole et al. ........ 379/88.23 |
| 5,109,405 A | | 4/1992 | Morganstein |
| 5,200,994 A | | 4/1993 | Sasano et al. |
| 5,341,411 A | | 8/1994 | Hashimoto |
| 5,347,574 A | | 9/1994 | Morganstein |
| 5,388,150 A | | 2/1995 | Schneyer et al. |
| 5,452,346 A | | 9/1995 | Miyamoto |
| 5,467,388 A | | 11/1995 | Redd, Jr. et al. |
| 5,490,205 A | | 2/1996 | Kondo et al. |
| 5,553,125 A | | 9/1996 | Martensson |
| 5,563,935 A | | 10/1996 | Small |
| 5,602,908 A | | 2/1997 | Fan |
| 5,659,602 A | | 8/1997 | Gay |
| 5,748,709 A | | 5/1998 | Sheerin |
| 5,883,942 A | | 3/1999 | Lim et al. |
| 5,920,623 A | * | 7/1999 | Bensman et al. ........... 379/361 |
| 5,970,128 A | | 10/1999 | Kim |
| 6,044,148 A | | 3/2000 | Bleile |
| 6,130,936 A | * | 10/2000 | Hartmann ............. 379/142.01 |
| 6,137,871 A | | 10/2000 | Maier et al. |
| 6,195,421 B1 | | 2/2001 | Chen |
| 6,198,812 B1 | * | 3/2001 | Weber .................. 379/142.04 |
| 6,298,122 B1 | * | 10/2001 | Horne .................... 379/93.09 |
| 6,298,130 B1 | | 10/2001 | Galvin |
| 6,304,642 B1 | | 10/2001 | Beamish et al. |
| 6,333,978 B1 | * | 12/2001 | Tamura ................. 379/142.12 |
| 6,434,394 B1 | * | 8/2002 | Grundvig et al. .......... 455/463 |
| 6,654,452 B1 | | 11/2003 | Murray et al. |
| 6,671,369 B2 | * | 12/2003 | Reindle ..................... 379/361 |
| 6,707,895 B2 | * | 3/2004 | Reindle et al. ........ 379/142.13 |
| 2002/0009185 A1 | | 1/2002 | Tung |
| 2002/0041666 A1 | * | 4/2002 | Mastro et al. ............. 379/199 |

OTHER PUBLICATIONS callmenot.safeserver.com/about_sceener.phtml, 2001.

* cited by examiner

Primary Examiner—Quoc D. Tran
(74) Attorney, Agent, or Firm—Fay, Sharpe, Fagan, Minnich & McKee, LLP

(57) ABSTRACT

A method and apparatus for selectively sending a false system information tone (SIT) in response to an incoming telephone call is provided. One embodiment of the apparatus includes a telephone line interface, caller identification (caller ID) module, programmable oscillator, display device, and controller. In another embodiment, the apparatus includes a data storage module, telephone line interface, caller ID module, programmable oscillator, display device, controller, and one or more control devices. The method includes the steps of: a) detecting a ring on the telephone line, b) receiving information about a calling party associated with the incoming telephone call, c) determining if a false SIT is to be sent based on the calling party information, and, d) if the false SIT is to be sent, i) determining when the false SIT is to be sent; ii) generating the false SIT; and, iii) sending the false SIT at the determined time.

30 Claims, 20 Drawing Sheets

METHOD AND APPARATUS FOR SELECTIVELY SENDING A FALSE SYSTEM INFORMATION TONE ON A TELEPHONE LINE

BACKGROUND OF INVENTION

The invention relates to the field of telephony and more particularly to a method and apparatus for selectively sending a false system information tone (SIT) on a telephone line in response to an incoming telephone call. It finds particular application in conjunction with selectively sending the false SIT based on information received over the telephone line about the calling party associated with the incoming telephone call and will be described with particular reference thereto. However, it is to be appreciated that the invention is also amenable to other applications.

Telemarketing has increased exponentially in recent times. Many people targeted by telemarketers do not desire to receive or answer the telemarketing calls. Thus, it is desirable to provide a method and apparatus that may be used to block telemarketing calls and potentially reduce or eliminate future telemarketing calls.

One method for preventing some telemarketing calls is to have your telephone number removed from the dialing list of the telemarketer. This method, however, involves effort and is only partially effective because new calling lists are constantly generated which reestablish your number as a target.

Another method to block calls is to simply take your phone off the hook when telemarketing calls are undesired. Such a method is undesirable because the method does not permit desired calls to be connected and received. The method also causes the phone to emit a loud off-hook warning signal that may annoy the owner of the phone. Instead of leaving the phone off the hook, a person may use an answering machine or a caller identification (caller ID) device to screen calls. Both of these methods are undesirable because some people do not leave messages, and some numbers cannot be identified by the caller ID device.

In view of these deficiencies, devices have been developed to permit selective blocking of calls. For instance, U.S. Pat. No. 5,467,388 discloses a method and apparatus for selectively blocking incoming telephone calls. The patent discloses an apparatus that may be programmed to selectively block calls either by time block or by number. The user must, however, spend time to program the system and remember to activate it when the blocking function is desired. Such steps are generally undesired due to the effort required by the user. Thus, a method and apparatus that automatically blocks calls placed from a predictive dialing telemarketing system is highly desirable. Further, the method and apparatus should not require any preprogramming or activation steps. Also, the system must allow desired calls to be connected while still blocking undesired calls.

To more fully understand the concepts of the present invention, it should be understood that most large-scale automated telemarketing systems use predictive or auto-dialers to place the phone calls. These dialers obtain a number to be called from a computer database and place the telemarketing calls for the operator. If a call is connected and a live person responds, the system immediately connects the call to a salesperson, operator, or solicitor who makes a presentation. If the line is unanswered, busy, or answered by an answering machine, the system flags the number and returns to the number at a later time and recalls it. In this manner, the telemarketing system continues to call all programmed numbers until a live person answers. The system also does not waste time having the operator place unanswered calls.

In other situations where the called number has been disconnected or is otherwise no longer in service, the automated telemarketing system removes the number from its computer database. The computer differentiates the status of the number by recognizing special information tones (SITs) used in the U.S. telephone network. The network uses the SITs to provide information to computers in the network. SITs include three precise, sequential tones used to identify recorded announcements provided for ineffective call attempts in the telephone network. There are seven major SIT types, known as SIT1 through SIT7. A telemarketing system is designed to maximize outbound calls and maximize completed calls. Thus, most quality telemarketing systems are designed to recognize SITs. One of the most common SITs is SIT2 which is the intercept SIT. The intercept SIT is used to describe an uncompleted call attempt due to a nonworking number. The intercept SIT begins with a tone of 913.8 Hz that is played for 274 milliseconds. This tone is followed by a second tone of 1370.6 Hz played for 274 milliseconds and completed with a third tone at 1776.7 Hz played for 380 milliseconds. When this SIT is received by a telemarketing system using a predictive dialer, the system notes that the number called is non-working and removes it from its database so that it will not be called again.

U.S. Pat. No. 5,920,623, commonly assigned to Royal Appliance Mfg. Co., discloses a method and apparatus for defeating a predictive dialing telemarketing system. The apparatus includes a signal generator in the nature of an oscillator that is capable of creating a 914 Hz sine wave that substantially imitates the first tone of an intercept SIT (i.e., SIT2) used by the telephone network to indicate a nonworking number. The oscillator signal is amplified by an amplifier. The imitation signal is selectively sent in response to an incoming telephone call when a controller closes a relay to connect the imitation signal to the telephone line. The controller is prompted to close the relay by an off-hook detector that indicates to the controller when a voice signal is established. In addition to this embodiment, the '623 patent contemplated the capability to create any of the known SIT sequences in full or in part. The device produced in conjunction with the '623 patent was powered using a conventional a.c. utility power adapter. However, there is no need to send the imitated SIT to all callers, particularly callers that are known to not be telemarketers.

Devices capable of displaying caller ID information are increasingly common. In fact, caller ID services are one of a group of network-provided enhanced services known as custom local area signaling services (CLASS).

In one common type of caller ID service, a device for displaying caller ID information is equipped with a Frequency Shift Key (FSK) detector, a controller, and a display. When a call is placed to the phone, a Stored Program Control System (SPCS) server situated within the Public Switched Telephone Network (PSTN) activates a corresponding FSK generator also situated within the PSTN to transmit a FSK signal encoding the caller ID information over the telephone line. At the device for displaying caller ID information, when a first ring is detected, the controller enables the FSK detector, which listens for an FSK signal. If an FSK signal is detected before the second ring, it is demodulated to obtain the caller ID information. That information is then displayed. If, however, the FSK signal is not detected before the second ring, the FSK detector is disabled.

In an environment with many users of the same telephone, it can become quite irritating to always answer the phone only to find out the call is not for you. Some people resort to not answering at all—running the risk of missing potentially important calls. Existing caller ID devices can solve this problem—if you are near enough to the unit to see it.

Notably, no device currently implements selectively sending a false SIT over a telephone line based on caller ID information for the incoming telephone call. It is desirable to provide a device that includes the features of sending a false SIT over a telephone line while displaying caller ID information. Furthermore, no device currently combines the features of selectively sending a false SIT with distinctive ringing or distinctive indicator cues based on the caller ID information.

BRIEF SUMMARY OF INVENTION

Thus, there is a particular need for a device that selectively sends a false system information tone (SIT) over a telephone line based on caller identification (caller ID) information. There is also a particular need for a device that combines the added feature of distinctive ringing or distinctive indicator cues based on the caller ID information. The invention contemplates such a device that overcomes at least one of the above-mentioned problems and others.

In one aspect of the invention, an embodiment of an apparatus in communication with a telephone line is provided. In this embodiment, the apparatus includes a base unit, the base unit including a telephone line interface module, a caller ID module, a programmable oscillator module for selectively generating a false SIT, a first display device, and a first controller.

In another aspect of the invention, another embodiment of an apparatus in communication with a telephone line is provided. In this embodiment, the apparatus includes a base unit, the base unit including a data storage module, a telephone line interface module, a caller ID module, a first programmable oscillator module for selectively generating a false SIT, a first display device, a first controller, and one or more control devices.

In still another aspect of the invention, a method for selectively sending a false SIT on a telephone line in response to an incoming telephone call is provided. The method including the steps of: a) detecting a ring on the telephone line for an incoming telephone call; b) receiving information over the telephone line about a calling party associated with the incoming telephone call; c) determining if a false SIT is to be sent over the telephone line call based on the information received about the calling party; and, d) if it is determined that the false SIT is to be sent: i) determining when the false SIT is to be sent over the telephone line; ii) generating the false SIT; and, iii) sending the false SIT over the telephone line at the determined time in response to the incoming telephone call.

One advantage of the invention is that false SITs are not generated for incoming telephone calls for which false SITs are known to not be required.

Another advantage of the invention is that distinctive information about an incoming telephone call may be presented visually and/or audibly to users before the telephone is answered.

Still other benefits and advantages of the invention will become apparent to those of ordinary skill in the art upon reading and understanding the description of the invention provided herein.

BRIEF DESCRIPTION OF DRAWINGS

The invention is described in more detail in conjunction with a set of accompanying drawings.

DETAILED DESCRIPTION

Figure 1:
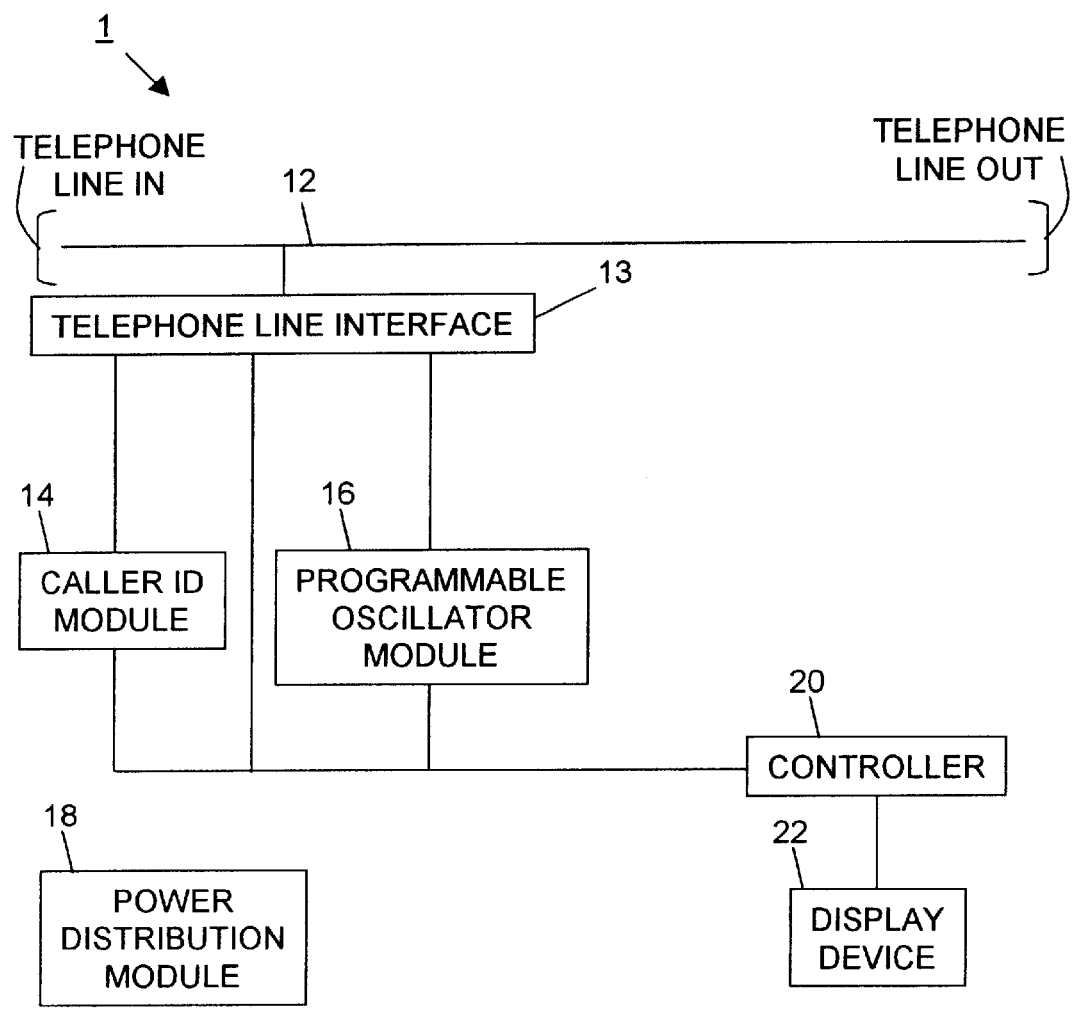
FIG. 1 is a block diagram of a telephone call management system in an embodiment of the invention.

While the invention is described in conjunction with the accompanying drawings, the drawings are for purposes of illustrating exemplary embodiments of the invention and are not to be construed as limiting the invention to such embodiments. It is understood that the invention may take form in various components and arrangement of components and in various steps and arrangement of steps beyond those provided in the drawings and associated description. Within the drawings, like reference numerals denote like elements.

With reference to FIG. 1, a block diagram of a telephone call management system 1 in an embodiment of the invention is provided. The system 1 is operatively coupled to a standard telephone line 12 via a telephone line interface module 13. In this embodiment, the system 1 also includes a caller identification (caller ID) module 14, a programmable oscillator module 16, a power distribution module 18, a controller 20, and a display device 22. Typically these components are packaged together as a base unit. The caller ID module 14 and programmable oscillator module 16 are in communication with the telephone line interface module 13. The controller 20 is in communication with the telephone line interface module 13, caller ID module 14, programmable oscillator module 16, and display device 22. The power distribution module 18 provides the required electrical power to other components typically associated in the base unit.

The telephone line interface module 13 detects and conditions signals carried on the telephone line 12 for the caller ID module 14 and controller 20. The telephone line interface module 13 also conditions audio signals generated by the programmable oscillator module 16 and communicates the audio signals to calling parties over the telephone line 12. As such, the telephone line interface module 13 may include a variety of components in various combinations. For example, typically the telephone line interface module 13 includes a ring detector to detect an incoming telephone call. The telephone line interface module 13 communicates the detection of an incoming telephone call to the controller 20. The controller 20 may wait until the first ring is complete and enable the caller ID module 14. Between the first and second rings the telephone line interface module 13 may detect information about the calling party associated with the incoming telephone call. The calling party information may be conditioned by the telephone line interface module 13 and communicated to the caller ID module 14.

The telephone line interface module 13 also typically includes a hooking control circuit, an off-hook detector, or similar components. The hooking control circuit places the telephone line 12 in an off-hook condition when the controller 20 has determined that the system 1 will answer the incoming telephone call. The off-hook detector detects when any device at the receiving party end places the telephone line 12 in an off-hook condition. When an off-hook condition occurs, the telephone line interface module 13 communicates the condition of the telephone line 12 to the controller 20. The controller 20 may then select an audio signal to be generated and enable the programmable oscillator module 16. The telephone line interface module 13 also typically includes buffering and amplifier circuits to condition the audio signals generated by the programmable oscillator module 16 in order to properly couple the signals to the telephone line 12. The telephone line interface module 13 may also include components to detect dual tone multifrequency tones (DTMF) on the telephone line 12 for communication to the controller 20.

The caller ID module 14 operates in conjunction with commonly known caller ID services provided by telephone companies. The caller ID module 14 is a type commonly known in the art.

The programmable oscillator module 16 generates audio signals that may be sent over the telephone line. In one aspect, the programmable oscillator module 16 generates an audio signal that imitates a telephone network SIT. In other words, the programmable oscillator module 16 generates a false SIT. SITs are sine wave signals with a predetermined frequency and duration. SITs produce three precise, sequential tones used to identify certain conditions related to ineffective call attempts in the telephone network. The frequencies and durations of the tones are generally known in the art and may be obtained from numerous sources including, for example, the Audichron Operator's Manual 0M10-0022. The programmable oscillator module 16 can generate false SITs representing any one of the seven major SIT sequences (i.e., SIT1, SIT2, SIT3, SIT4, SIT5, SIT6, and SIT7). In doing so, the programmable oscillator module 16 can generate a false signal substantially similar to the first tone, first and second tone, or all three tones of any one of the seven major SITs.

A false SIT2 is particularly useful because many predictive or automated dialing systems will recognize a SIT2 as a nonworking number and, in the interest of conserving time, determine that a SIT2 has been received after the first tone in the three-tone sequence has been detected. Thus, it may only be necessary to send the first tone in the sequence to defeat a dialing system used by a telemarketer. The predictive dialing system is said to be "defeated" because the false SIT will cause the predictive dialing system to immediately disconnect the call and remove the telephone number from the telemarketer's database.

The programmable oscillator module 16 generates audio signals in response to control signals communicated by the controller 20. Thus, when the controller 20 determines a false SIT is required, the controller 20 enables the programmable oscillator module 16 and communicates the appropriate control signals to construct the required audio signal. The programmable oscillator module 16 may also generate many other types of audio signals, including an outgoing verbal message.

The power distribution module 18 is typically adapted to receive electrical power from a standard a.c. utility outlet. Alternatively, the power distribution module 18 may be adapted to receive electrical power from a battery or battery pack. Various types of batteries, including rechargeable and non-rechargeable batteries, may be used. The power distribution module 18 may be adapted to receive electrical power from both the standard a.c. utility outlet and the battery/battery pack or from either the standard a.c. utility outlet or the battery/battery pack individually.

The controller 20 receives information from the telephone line interface module 13 and the caller ID module 14 and determines what information is to be displayed on the display device 22, determines when the information is displayed on the display device 22, and communicates with the display device 22 to display the information at the determined time. Alternatively, if no calling party information is received for the incoming telephone call, the controller 20 may determine that no information will be displayed on the display device 22.

Using the information from the telephone line interface module 13 and the caller ID module 14, the controller 20 also determines whether to place the telephone line 12 in an off-hook condition or to wait for another device at the receiving party end to place the telephone line in an off-hook condition. For example, if no calling party information is received for the incoming telephone call, the controller 20 may control the telephone line interface module 13 to place the telephone line in an off-hook condition. Conversely, if calling party information is received for the incoming telephone call, the controller 20 may wait for another device at the receiving party end to place the telephone line in an off-hook condition. Alternatively, the controller 20 may be set up to wait for another device at the receiving party end to place the telephone line in an off-hook condition regardless of whether or not calling party information is received.

Using the information received from the telephone line interface unit 13 and the caller ID module 14, the controller also determines whether or not to send the false SIT in response to the incoming telephone call and, if the false SIT is to be sent, communicates with the programmable oscillator module to selectively generate the false SIT and communicates with the telephone line interface module 13 to selectively send the false SIT at the determined time. For example, if the system 1 is set up so that the telephone line 12 is placed in an off-hook condition when no calling party information is received for the incoming telephone call, it is preferable that the system 1 is also set up to send a false SIT after the telephone line 12 is placed in the off-hook condition. Conversely, if calling party information is received for the incoming telephone call, the controller 20 may be set up to not send the false SIT when another device at the receiving party end places the telephone line 12 in an off-hook condition. Alternatively, the controller 20 may be set up to send a false SIT in response to each incoming telephone call regardless of whether or not calling party information is received.

The display device 22 displays information about the calling party associated with the incoming telephone call. The display device 22 may be comprised of multiple light emitting diodes (LEDs) or similar types of indicators. For example, a red LED may be used as an indicator cue that no information was detected on the telephone line between the first and second ring for the current incoming telephone call. Similarly, a green LED may be used as an indicator cue that calling party information was detected on the telephone line for the current incoming telephone call. The LEDs may be continuously illuminated or flashing during the incoming telephone call.

Alternatively, the display device may be a multiple character display or similar device capable of displaying multiple alphanumeric characters. This type of display may provide similar indicator cues to the red and green LEDs described above. Additionally, the telephone number of the calling party associated with the current incoming telephone call may be displayed. The name of the calling party may also be displayed. Other messages may also be displayed, particularly if no calling party information was received for the incoming telephone call. Conversely, if no calling party information is received for the incoming telephone call and the system 1 is set up to place the telephone line in an off-hook condition when no calling party information is received, no information may be displayed on the display device 22 for the incoming telephone call.

Figure 2:
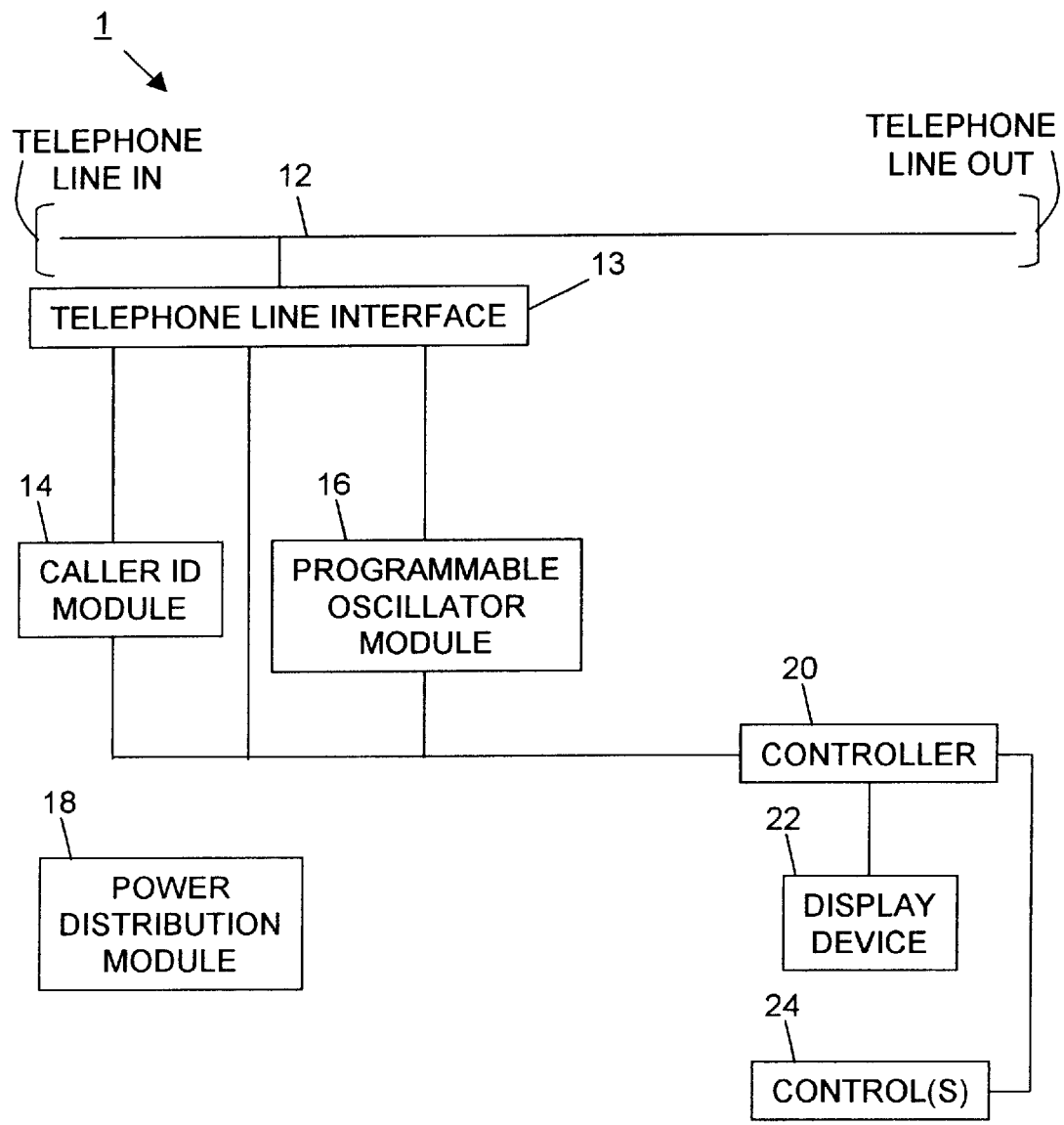
FIG. 2 is a block diagram of the telephone call management system of FIG. 1 with an additional component.

With reference to FIG. 2, a block diagram of the telephone call management system 1 of FIG. 1 with an additional component is provided. More specifically, control(s) 24 are added to the components of the system 1 described above. The control(s) 24 include one or more control devices in communication with the controller 20. There may be various types of control devices, including pushbutton switches, toggle switches, slide switches, momentary or latching switches, selector switches, or potentiometers. Typically, the control(s) 24 are packaged together with other components associated with the base unit. The control(s) 24 are for activation by a user and for communicating control signals associated with manual control of the base unit to the controller 20. The control(s) 24 may serve various functions, including setting up preferences for the system 1, manually disabling/enabling the caller ID module 14, manually disabling/enabling the programmable oscillator module 16 or its false SIT generation function, and acknowledging indicator cues and messages on the display device 22.

The control(s) 24 also permit calling party information from previous incoming telephone calls to be viewed on the display device 22. For this feature the combination of the caller ID module 14 and the controller 20 must store a record of the calling party information from previous incoming telephone calls. The control(s) 24 provide the user with a means of advancing forward and backward through the recorded calling party information and a means for deleting calling party information associated with a previous incoming telephone call.

Figure 3:
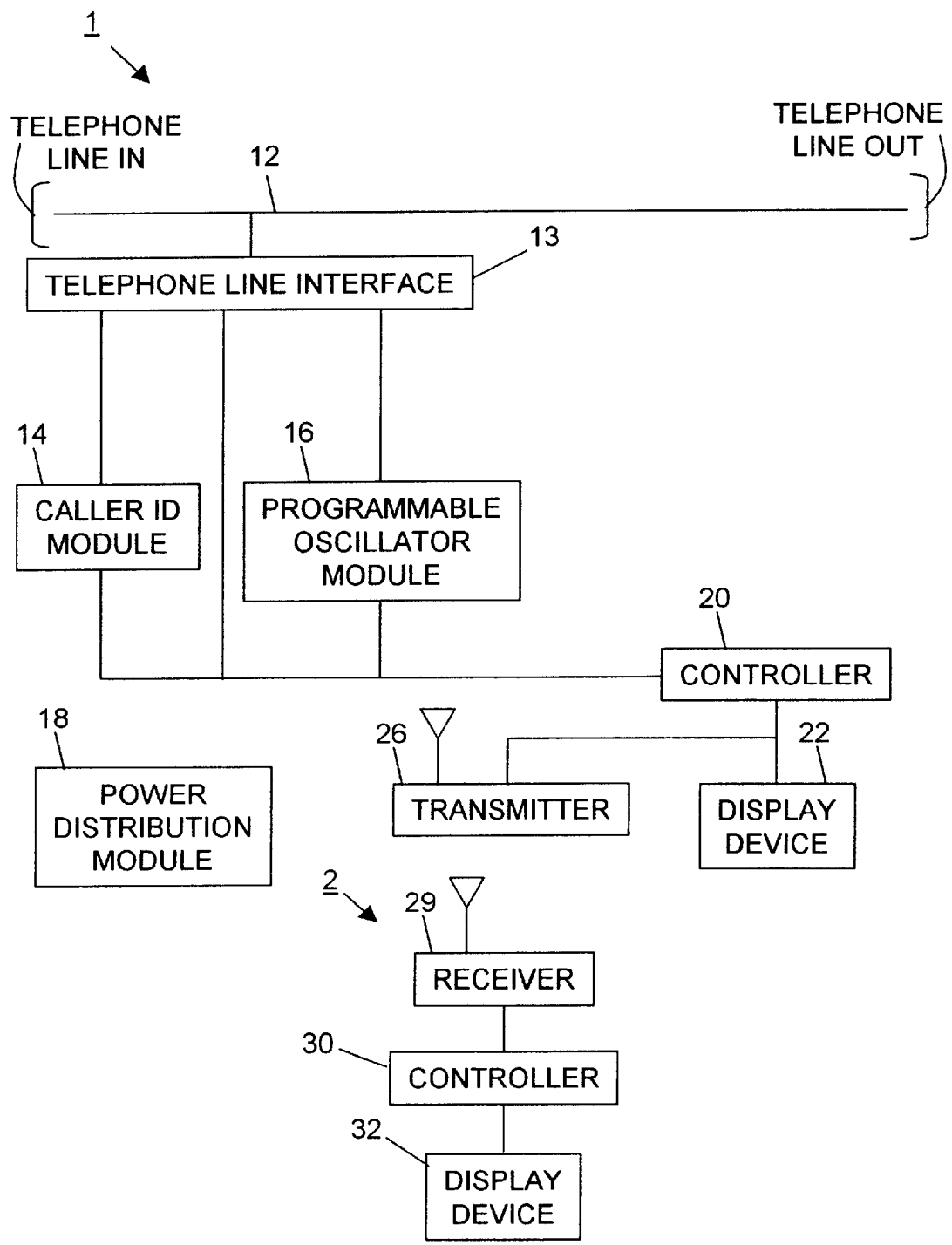
FIG. 3 is a block diagram of the telephone call management system of FIG. 1 with additional components, including a display remote unit.

With reference to FIG. 3, a block diagram of the telephone call management system 1 of FIG. 1 with additional components, including an embodiment of a display remote unit 2, is provided. A transmitter 26 is added to the components associated with the base unit in the system 1 of FIG. 1. The transmitter 26 is in communication with the controller 20 for transmitting wireless communications. Typically, the transmitter 26 is packaged together with other components associated with the base unit. The display remote unit 2 is wireless and operatively coupled to the transmitter 26 for receiving wireless communications when the display remote unit 2 is within communicative range of the transmitter 26.

The display remote unit 2 includes a receiver 29, a second controller 30, and a second display device 32. The receiver 29 is the subcomponent that is operatively coupled to the transmitter 26. Like the display device 22 associated with the base unit, the second display device 32 displays information about the calling party associated with one or more incoming telephone calls. The second display device 32 may be any type described above for the display device 22 associated with the base unit. The display devices (22, 32) can be different types, although typically all the display devices (22, 32) in the system 1 are substantially the same.

The second controller 30 is in communication with the receiver 29 and the second display device 32. The second controller 30 receives the calling party information from the controller 20 associated with the base unit via the wireless communication path. Similar to the controller 20, the second controller 30 determines what information is to be displayed on the second display device 32, determines when the information is displayed on the second display device 32, and communicates with the second display device 32 to display the information at the determined time. Alternatively, the second controller 30 may also receive commands and other information from the controller 20 associated with the base unit. In this alternative the controller 20 and second controller 30 operate in a master-slave fashion and the second display device 32 usually reflects the same information displayed on the display device 22 associated with the base unit.

The display remote unit 2 is mobile and may be positioned in a convenient location, for example, on a kitchen counter, next to a chair, on a deck or patio table, or next to a bed, so that the user may determine whether or not to answer the phone before even moving towards a more distant telephone unit. The display remote unit 2 also includes a power distribution module (not shown) adapted to receive electrical power from a battery or battery pack. Various types of batteries, including rechargeable and non-rechargeable batteries, may be used. The system 1 may include multiple wireless display remote units 2. The display remote units 2 can have different types of display devices 32, although typically the display devices 32 of each display remote unit 2 in the system 1 are substantially the same.

Figure 4:
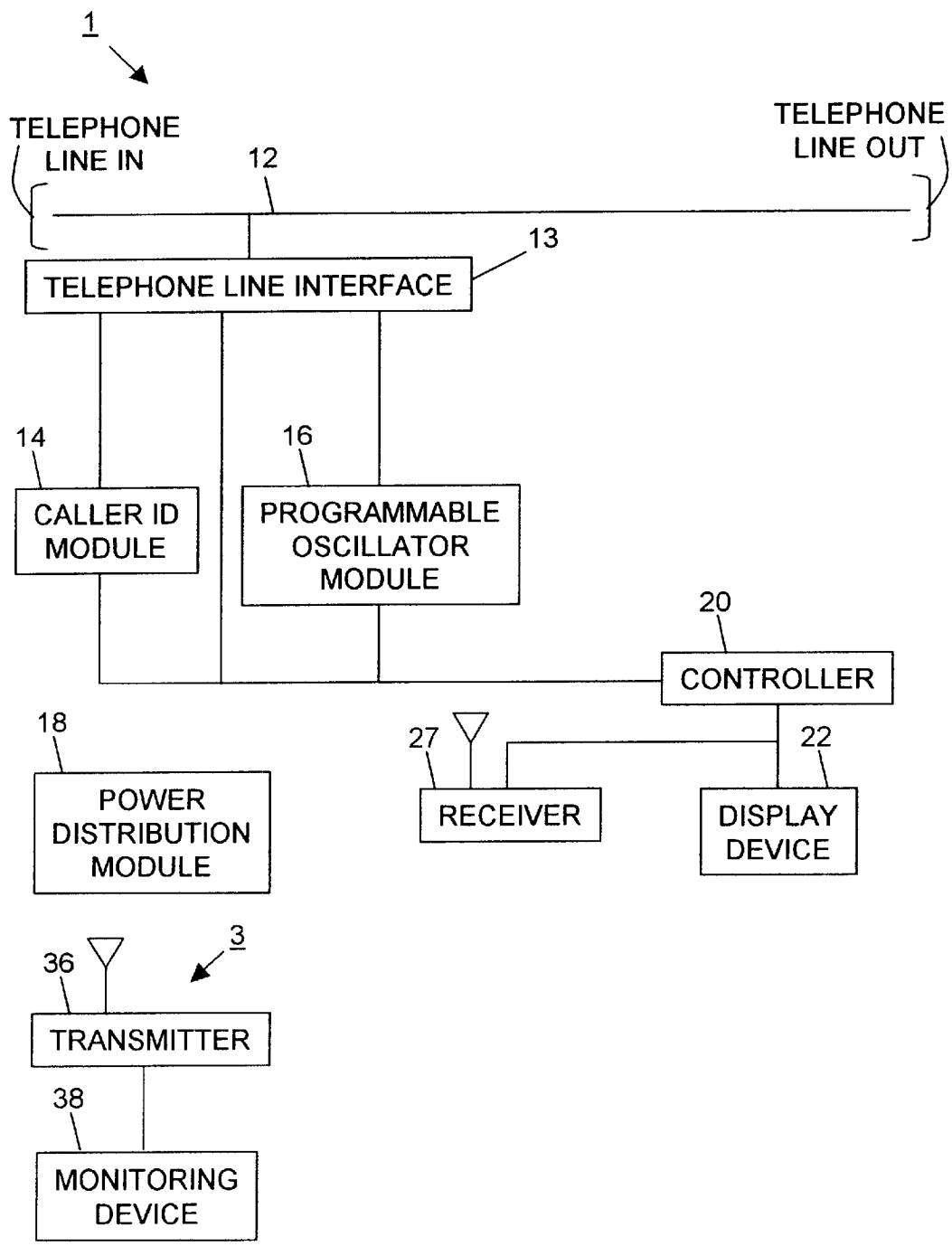
FIG. 4 is a block diagram of the telephone call management system of FIG. 1 with additional components, including a monitoring remote unit.

With reference to FIG. 4, a block diagram of the telephone call management system 1 of FIG. 1 with additional components, including a monitoring remote unit 3, is provided. The monitoring remote unit 3 is wireless and operatively coupled to the base unit for transmitting wireless communications to the base unit. A receiver 27 is added to the components associated with the base unit in the system 1 of FIG. 1. The receiver 27 is in communication with the controller 20 for receiving wireless communications when the monitoring remote unit 3 is within communicative range of the base unit. Typically, the receiver 27 is packaged together with other components associated with the base unit.

The monitoring remote unit 3 includes a transmitter 36 and a monitoring device 38. The transmitter 36 is the subcomponent that is operatively coupled to the receiver 27. The monitoring device 38 is a detector, sensor, measurement instrument, or other type of monitoring device for monitoring a remote condition. Wireless communications are transmitted from the monitoring remote unit 3 indicating the status of the remote condition. The controller 20 receives the status information via the receiver 27 and determines what information is to be displayed on the display device 22, determines when the information is displayed on the display device 22, and communicates with the display device 22 to display the information at the determined time. The display device 22 may include one or more indicator cues associated with the status of the remote condition. Colored LEDs, other types of colored indicators, text messages, or combinations thereof are used as remote condition indicator cues. Remote condition indicator cues may also be included in the second display device 32 of a display remote unit 2.

An example of a remote condition that can be monitored is a garage door. The status of the garage door is open or closed as determined by a laser or infrared sensor. The monitoring remote unit 3 may periodically transmit the status of the garage door to the base unit. The controller 20 may illuminate a green LED when the garage door is closed and a red LED when the garage door is open. The indicator cues could be flashed for emphasis. Various types of remote conditions can be monitored. For example, the status of outside doors, windows, or appliances. The monitoring device 38 for the remote device 3 must be suited for the remote condition to be monitored.

The monitoring remote unit 3 also includes a power distribution module (not shown) adapted to receive electrical power from a battery or battery pack. Various types of batteries, including rechargeable and non-rechargeable batteries, may be used. The system 1 may include multiple wireless monitoring remote units 3. Each wireless monitoring remote unit 3 may have a different type of monitoring device 38.

Figure 5:
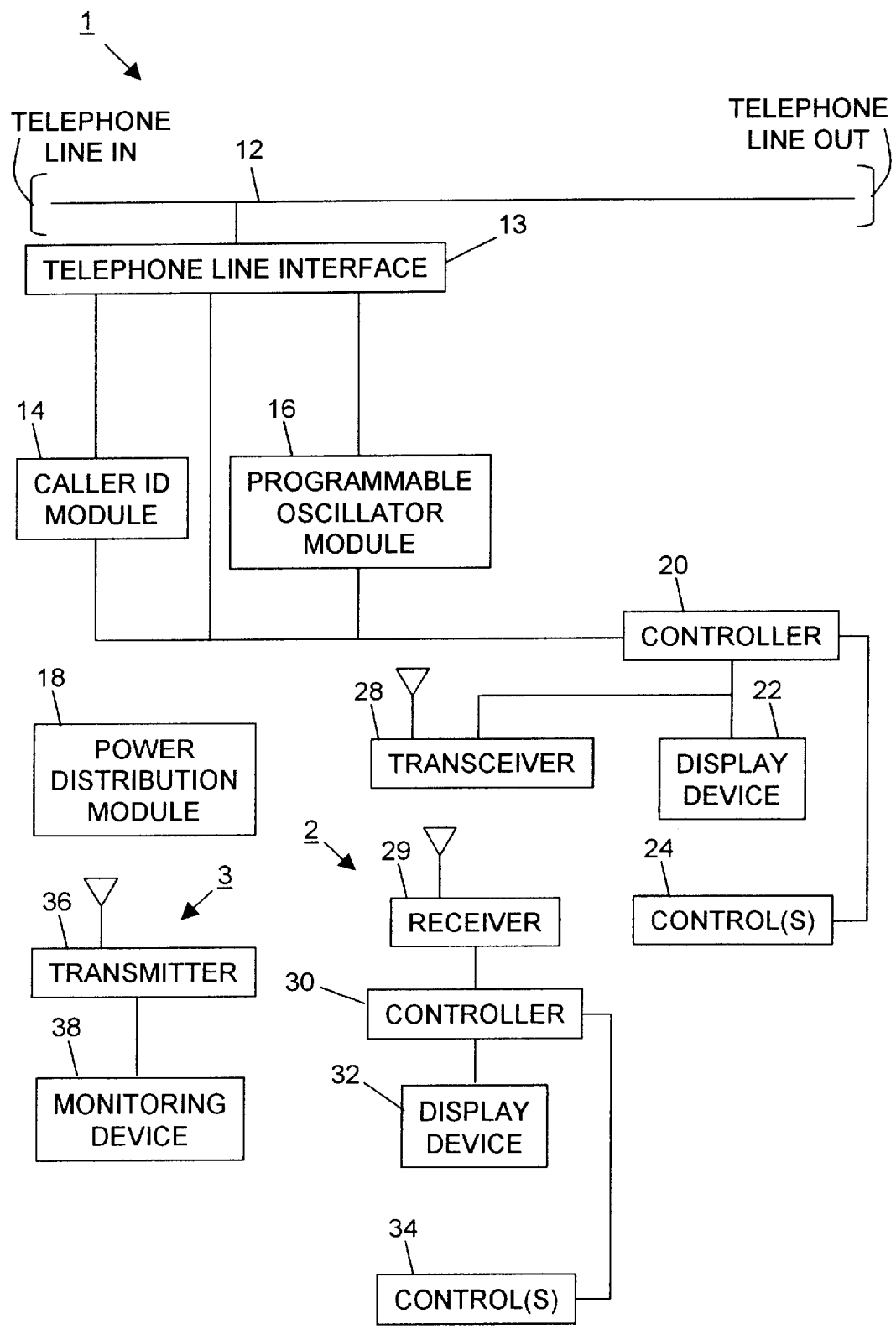
FIG. 5 is a block diagram of the telephone call management system of FIG. 1 with additional components.

With reference to FIG. 5, a block diagram of the telephone call management system 1 of FIG. 1 with additional components is provided. More specifically, control(s) 24 and a transceiver 28 are added to the components associated with the base unit and a display remote unit 2 and a monitoring remote unit 3 are added to the system 1. Basically, FIG. 5 reflects a configuration of the system 1 with all of the various components of FIGS. 1–4 combined. The control(s) 24 are as described above for FIG. 2. The transceiver 28 incorporates the functions of the transmitter 26 of FIG. 3 and the receiver 27 of FIG. 4 in a single component. Alternatively, a separate transmitter 26 and receiver 27 may be used in combination in place of the transceiver 28.

The display remote unit 2 is as described above for FIG. 3 with the addition of second control(s) 34 in communication with the second controller 30. The second control(s) 34 may be any type described above for the control(s) 24 associated with the base unit. The control(s) (24, 34) can be different types. A system 1 may include a display remote unit 2 with control(s) 34 even if the base unit does not have control(s) 24. The monitoring remote unit 3 is as described above for FIG. 4. The system 1 can include multiple display remote units 2 and multiple monitoring remote units 3 in various configurations.

Figure 6:
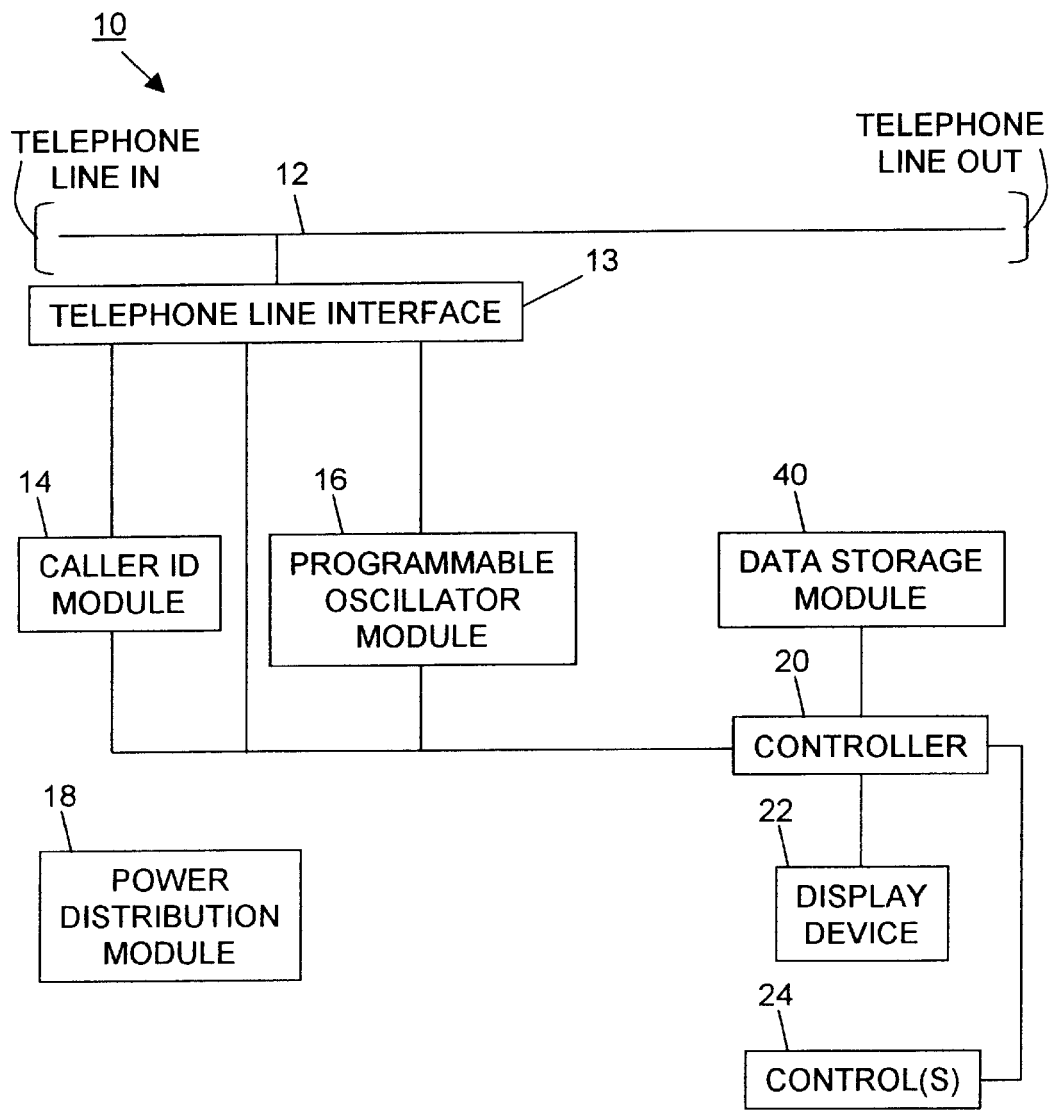
FIG. 6 is a block diagram of another embodiment of a telephone call management system of the invention.

With reference to FIG. 6, a block diagram of another embodiment of a telephone call management system 10 of the invention is provided. The system 10 is operatively coupled to a standard telephone line 12 via a telephone line interface module 13. In this embodiment, the system 10 also includes a caller ID module 14, a programmable oscillator module 16, a power distribution module 18, a controller 20, a display device 22, control(s) 24, and a data storage module 40. Typically these components are packaged together as a base unit. The caller ID module 14 and programmable oscillator module 16 are in communication with the telephone line interface module 13. The controller 20 is in communication with the telephone line interface module 13, caller ID module 14, programmable oscillator module 16, display device 22 control(s) 24, and data storage module 40. The power distribution module 18 provides the required electrical power to other components typically associated in the base unit.

The telephone line interface module 13, caller ID module 14, programmable oscillator module 16, power distribution module 18, controller 20, display device 22, and control(s) 24 operate as described above for the system 1 in reference to FIGS. 1–5.

The data storage module 40 is for storing information about one or more potential calling parties associated with incoming telephone calls on the telephone line 12. The information to be stored in the data storage module 40 may be entered using the control(s) 24. From the control(s) 24, the information is communicated to the controller 20. Typically, the controller 20 will display the information as it is entered on the display device 22 and permit the user to confirm the information to be stored. After the user confirms the information using the control(s), the controller 20 communicates the information to the data storage module 40 where it is stored.

The information stored in the data storage module is usually the telephone number of a potential calling party, although other information may also be stored. The potential calling party information may be stored in groups. In other words, for example, the telephone number of the potential calling party may be associated with a group. One group may be designated "local call blocking." If the user wants the call to be blocked by the system 10, the user would associate the potential calling party information with the "local call blocking" group. Another group or multiple groups may be designated "preferred." If the user knows a potential calling party is not a telemarketer, the user may designate the number as a "preferred" group and the system 10 may avoid sending the false SIT in response to incoming telephone calls from calling parties matched to information stored in the data storage module 40 that is associated with a "preferred" group.

The controller 20 receives information from the telephone line interface module 13 and the caller ID module 14 and determines what information is to be displayed on the display device 22, determines when the information is displayed on the display device 22, and communicates with the display device 22 to display the information at the determined time. Alternatively, if no calling party information is received for the incoming telephone call, the controller 20 may determine that no information will be displayed on the display device 22.

Using the information from the telephone line interface module 13 and the caller ID module 14, the controller 20 also determines whether to place the telephone line 12 in an off-hook condition or to wait for another device at the receiving party end to place the telephone line in an off-hook condition. For example, if no calling party information is received for the incoming telephone call, the controller 20 may control the telephone line interface module 13 to place the telephone line in an off-hook condition. Similarly, if the calling party information received for the incoming telephone call is matched to stored information for a potential calling party associated with the "local call blocking" group, the controller 20 may also control the telephone line interface module 13 to place the telephone line in an off-hook condition. Conversely, if calling party information is received for the incoming telephone call, the controller 20 may wait for another device at the receiving party end to place the telephone line in an off-hook condition. Alternatively, the controller 20 may be set up to wait for another device at the receiving party end to place the telephone line in an off-hook condition regardless of whether or not calling party information is received and, if information is received, regardless of the group to which the calling party information is matched.

Using the information received from the telephone line interface unit 13 and the caller ID module 14, the controller also determines whether or not to send the false SIT in response to the incoming telephone call and, if the false SIT is to be sent, communicates with the programmable oscillator module to selectively generate the false SIT and communicates with the telephone line interface module 13 to selectively send the false SIT at the determined time. For example, if the system 10 is set up so that the telephone line 12 is placed in an off-hook condition when no calling party information is received for the incoming telephone call or when the calling party information received is matched to stored information for a potential calling party associated with the "local call blocking" group, it is preferable that the system 10 is also set up to send a false SIT after the telephone line 12 is placed in the off-hook condition. Conversely, if calling party information is received for the incoming telephone call and matched to stored information for a potential calling party associated with a "preferred" group, the controller 20 may be set up to not send the false SIT when another device at the receiving party end places the telephone line 12 in an off-hook condition. Additionally, if calling party information is received for the incoming telephone call, but does not match any stored information for a potential calling party associated with a "preferred" group, the controller 20 may be set up to send the false SIT when another device at the receiving party end places the telephone line 12 in an off-hook condition. Alternatively, the controller 20 may be set up to send a false SIT in response to each incoming telephone call regardless of whether or not calling party information is received. The system 10 may implement various other alternatives for determining whether or not to send a false SIT, including using a "telemarketing" group to identify potential calling parties that should be sent a false SIT in response to incoming telephone calls.

The system 10 can also implement distinctive indicator cues when the calling party information for an incoming telephone call is matched to information stored in the data storage module 40 based on the group associated with the stored information. For example, the display device 22 may include LEDs, messages, or other types of indicator cues uniquely associated with "local call blocking," "preferred group 1," "preferred group 2," etc. The display device 22 may also include a "default" LED, message, or other type of indicator cue when calling party information is received, but does not match any stored information for a potential calling party associated with a "preferred" group.

After the controller 20 matches information received from the caller ID module 14 with information stored in the data storage module 40, the controller 20 may illuminate the appropriate indicator cue on the display device 22 based on the group associated with the stored information. The "preferred" groups may be set up based on calls known to be for specific individuals. For example, "preferred group 1" may be for a parent, "preferred group 2" may be for a second parent, and "preferred group 3" may be for a dependent. Indicator cues may be distinctive by different colors, flashed at different frequencies, or by other visually perceptible methods. The distinctive cues enable people at the receiving end of the telephone call to recognize who the incoming telephone call is for before it is answered. Distinctive ringing cues will be discussed in more detail below.

The controller 20 may be set up to not initiate any indicator cue for incoming telephone calls associated with the "local call blocking" group. If no calling party information is received for the incoming telephone call, the controller may either be set up to not initiate any indicator cue or to initiate an "information not available" indicator cue. The "information not available" and the "local call blocking" indicator cues may be the same.

Figure 7:
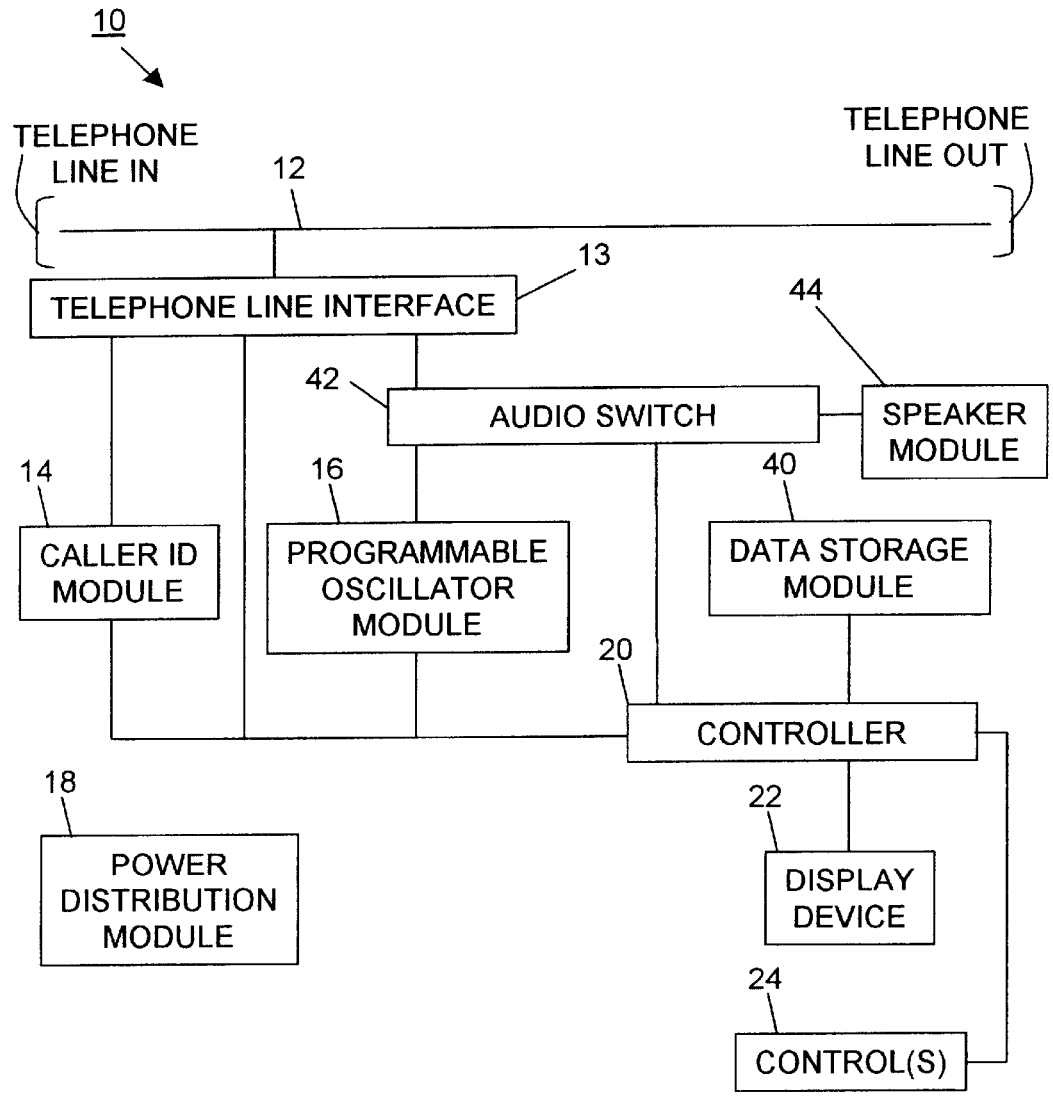
FIG. 7 is a block diagram of the telephone call management system of FIG. 6 with additional components.

With reference to FIG. 7, a block diagram of the telephone call management system 10 of FIG. 6 with additional components is provided. More specifically, an audio switch 42 and a speaker module 44 are added to the components of the system 10. The speaker module 44 is for annunciating a tone representing a telephone ringing to indicate there is an incoming telephone call on the telephone line. The speaker module 44 may include an amplifier and conditioning circuits to match the speaker properly within the overall audio circuit. The audio switch 42 is electrically positioned between the telephone line interface module 13 and the programmable oscillator module 16 and in communication with the speaker module 44. The audio switch 42 is for selectively switching the audio signal from the programmable oscillator module 16 to either the telephone line interface module 13 or to the speaker module 44.

The combination of the programmable oscillator module 16, audio switch 42, and speaker module 44 permit the controller 20 to implement distinctive ringing cues based on calling party information from the caller ID module 14 similar to the distinctive indicator cues described above. For example, after the controller 20 matches information received from the caller ID module 14 with information stored in the data storage module 40, the controller 20 may control the audio switch 42 to switch the audio signal from the programmable oscillator module 16 to the speaker module 44 and control the programmable oscillator module 16 to generate an appropriate audio signal producing the appropriate ringing cue from the speaker module 44 based on the group associated with the stored information. Similar to the distinctive indicator cues, distinctive ringing cues may be associated with "local call blocking," "preferred group 1," "preferred group 2," etc. Ringing cues may be distinctive by different sounds, different sequences of sounds, different frequencies, or by other audibly perceptible methods. The controller 20 may be set up to not initiate any ringing cue for incoming telephone calls associated with the "local call blocking" group. If no calling party information is received for the incoming telephone call, the controller may either be set up to not initiate any ringing cue or to initiate an "information not available" ringing cue. The "information not available" and the "local call blocking" ringing cues may be the same. If calling party information is received for the incoming telephone call, but not matched to information associated with any preferred group, the controller may be set up to initiate a "default" ringing cue.

The combination of the programmable oscillator module 16, audio switch 42, and speaker module 44 also permit the system 10 to implement a "hold" feature in conjunction with placing the telephone line in an off-hook condition and sending an outgoing verbal message on the telephone line 12. For example, if no calling party information is received for the incoming call, the controller 20 can cause the telephone line interface module 13 to place the telephone line 12 in an off-hook condition, cause the programmable oscillator 16 to generate an outgoing message instructing the calling party to enter information (e.g., the calling party's telephone number) using the telephone keypad, cause the telephone line interface module 13 to send the outgoing message on the telephone line 12, and cause the telephone line interface module 13 to detect DTMF tones on the telephone line 12 associated with the request. The DTMF tones (i.e., calling party information) can then be compared to potential calling party information stored in the data storage module 40 to determine if the incoming call is associated with a "local call blocking" or "preferred" group. Then the controller 20 handles the incoming call in the same manner as described above the "local call block" group, the "preferred" groups, or, if the DTMF tone do not match any stored potential calling party information, as a "default" incoming call.

Figure 8:
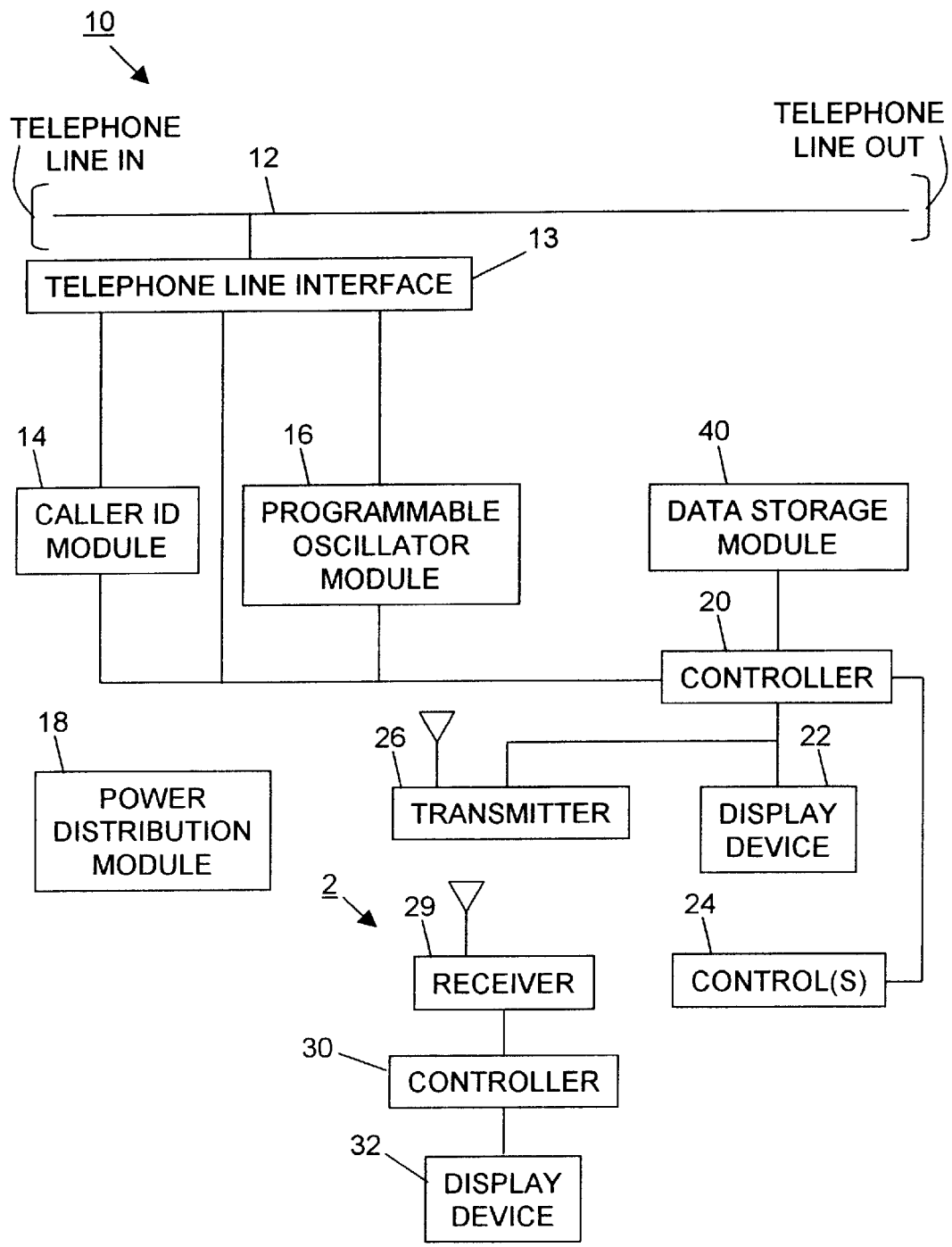
FIG. 8 is a block diagram of the telephone call management system of FIG. 6 with additional components, including a display remote unit.

With reference to FIG. 8, a block diagram of the telephone call management system 10 of FIG. 6 with additional components, including a display remote unit 2, is provided. A transmitter is added to the components associated with the base unit in the system 10 of FIG. 6. The transmitter 26 is in communication with the controller 20 and operates as described above for FIG. 3. Typically, the transmitter 26 is packaged together with other components associated with the base unit. The display remote unit 2 is wireless and operatively coupled to the transmitter 26 for receiving wireless communications when the display remote unit 2 is within communicative range of the transmitter 26. The display remote unit 2 includes a receiver 29, a second controller 30, and a second display device 32. The display remote unit 2 and subcomponents operate as described above for FIG. 3.

In addition, the combination of the transmitter 26 and the display remote unit 2 permit the system 10 to illuminate distinctive indicator cues for incoming telephone calls on the second display device 32. Distinctive indicator cues on the display remote unit 2 operate in the same manner as described above for FIG. 6. While distinctive indicator cues may be implemented on either the base unit or the remote unit, typically distinctive indicator cues are implemented on both. When distinctive indicator cues are implemented on both the base unit and the display remote unit 2, it is preferable that the distinctive cues on the remote unit are substantially the same as the distinctive cues on the base unit.

The system 10 may include multiple wireless display remote units 2. Each display remote unit 2 may have a different type of display device 32, although typically the display devices 32 on each display remote unit 2 in the system 10 are substantially the same. Distinctive indicator cues may be implemented on any display remote unit 2, all display remote units 2, or any combination of display remote units 2. When distinctive indicator cues are implemented on multiple display remote units 2, it is preferable that the distinctive cues on each remote unit are substantially the same.

Figure 9:
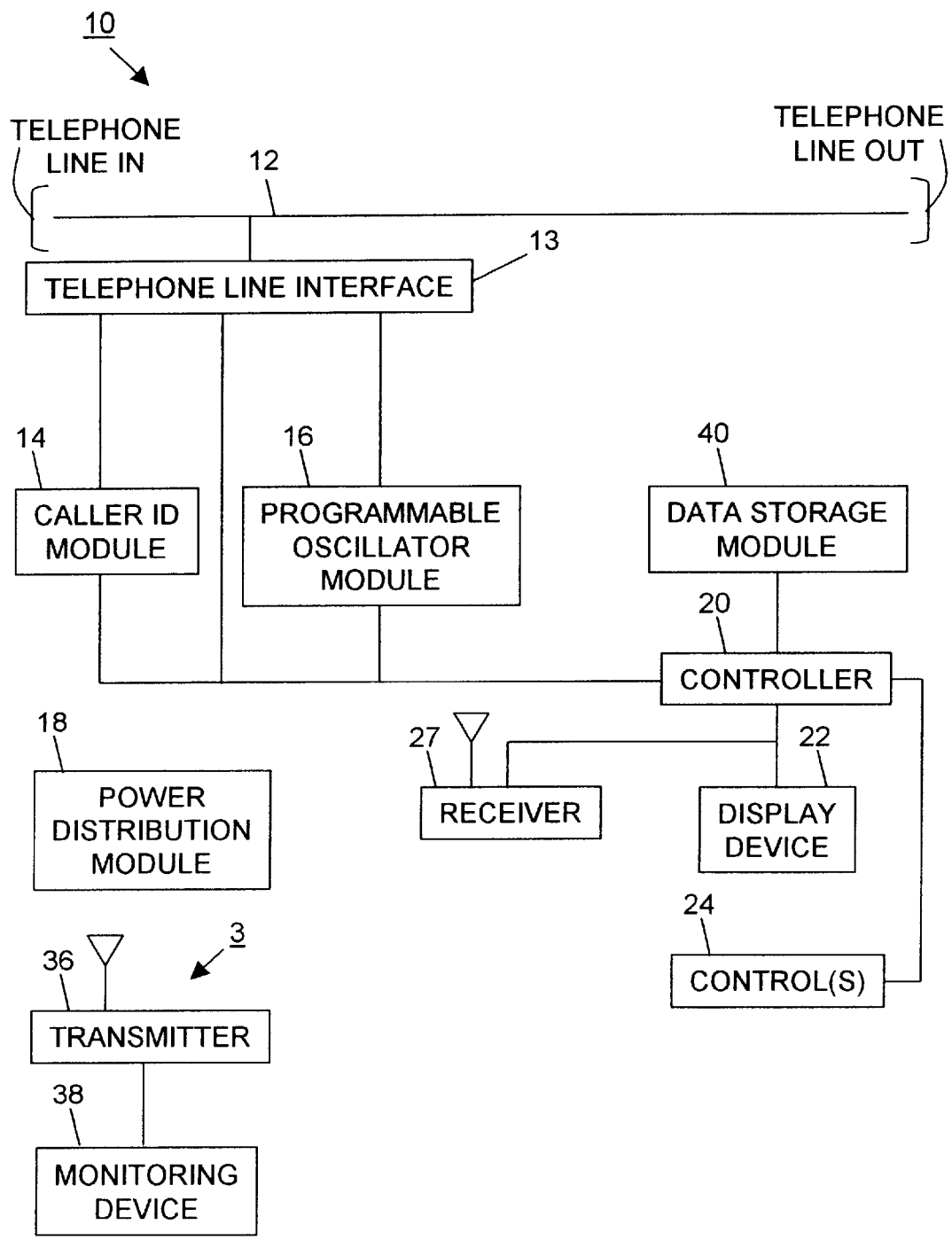
FIG. 9 is a block diagram of the telephone call management system of FIG. 6 with additional components, including a monitoring remote unit.

With reference to FIG. 9, a block diagram of the telephone call management system 10 of FIG. 6 with additional components, including a monitoring remote unit 3, is provided. The monitoring remote unit 3 is wireless and operatively coupled to the base unit for transmitting wireless communications to the base unit. The monitoring remote unit 3 includes a transmitter 36 and a monitoring device 38. The monitoring remote unit 3 and subcomponents operate as described above for FIG. 4. A receiver 27 is added to the components associated with the base unit in the system 10 of FIG. 6. The receiver 27 is in communication with the controller 20 and operates as described above for FIG. 4. Typically, the receiver 27 is packaged together with other components associated with the base unit. The system 10 may include multiple wireless monitoring remote units 3. Each monitoring remote unit 3 may have a different type of monitoring device 38.

Figure 10:
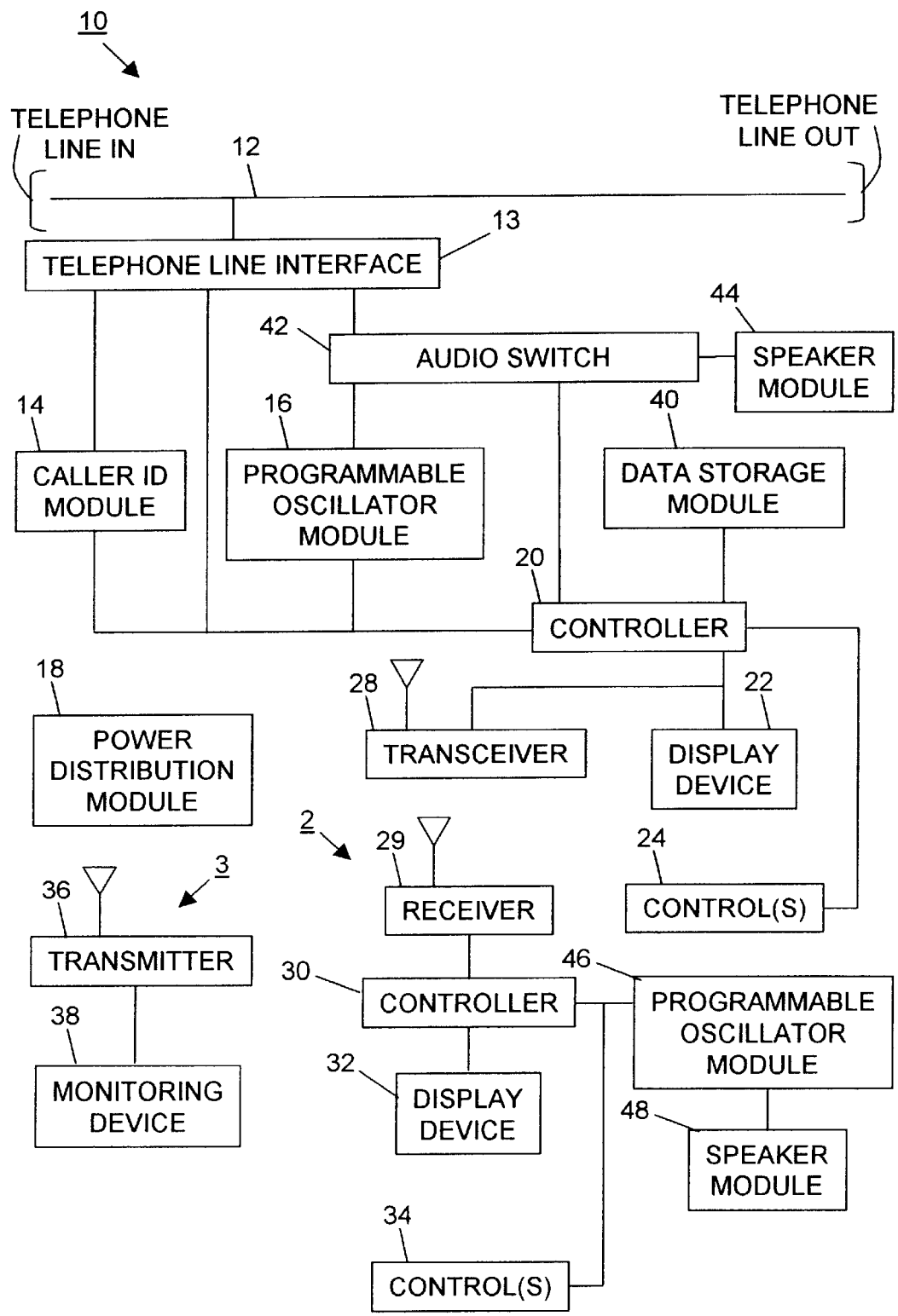
FIG. 10 is a block diagram of the telephone call management system of FIG. 6 with additional components.

With reference to FIG. 10, a block diagram of the telephone call management system 10 of FIG. 6 with additional components is provided. More specifically, a transceiver 28, an audio switch 42, and a speaker module 44 are added to the components associated with the base unit and a display remote unit 2 and a monitoring remote unit 3 are added to the system 10. Basically, FIG. 10 reflects a configuration of the system 10 with all of the various components of FIGS. 6–9 combined.

The transceiver 28 incorporates the functions of the transmitter 26 of FIG. 8 (as described in reference to FIG. 3) and the receiver 27 of FIG. 9 (as described in reference to FIG. 4) in a single component. Alternatively, a separate transmitter 26 and receiver 27 may be used in combination in place of the transceiver 28. The display remote unit 2 is as described above in reference to FIGS. 3 and 8 with the addition of second control(s) 34, a second programmable oscillator module 46, and a second speaker module 48. The second control(s) 34 and the second programmable oscillator module 46 are in communication with the second controller 30. The speaker module 48 is in communication with the second programmable oscillator module 46. The second control(s) 34 may be any type described above for the control(s) 24 associated with the base unit. The control(s) (24, 34) can be different types.

The combination of the second programmable oscillator module 16 and the second speaker module 46 permit the second controller 30 to implement distinctive ringing cues based on calling party information for incoming telephone calls. Distinctive ringing cues for the display remote unit 2 operate in the same manner as described above for FIG. 7. While distinctive ringing cues may be implemented on either the base unit or the remote unit, typically distinctive ringing cues are implemented on both. When distinctive ringing cues are implemented on both the base unit and the display remote unit 2, it is preferable that the distinctive cues on the remote unit are substantially similar to the distinctive cues on the base unit. As described above for distinctive indicator cues, distinctive ringing cues may be implemented on any display remote unit 2, all display remote units 2, or any combination of display remote units 2. When distinctive ringing cues are implemented on multiple display remote units 2, it is preferable that the distinctive cues on each remote unit are substantially the same.

The monitoring remote unit 3 is as described above for FIGS. 4 and 9. The system 10 can include multiple display remote units 2 and multiple monitoring remote units 3 in various configurations.

Figure 11A:
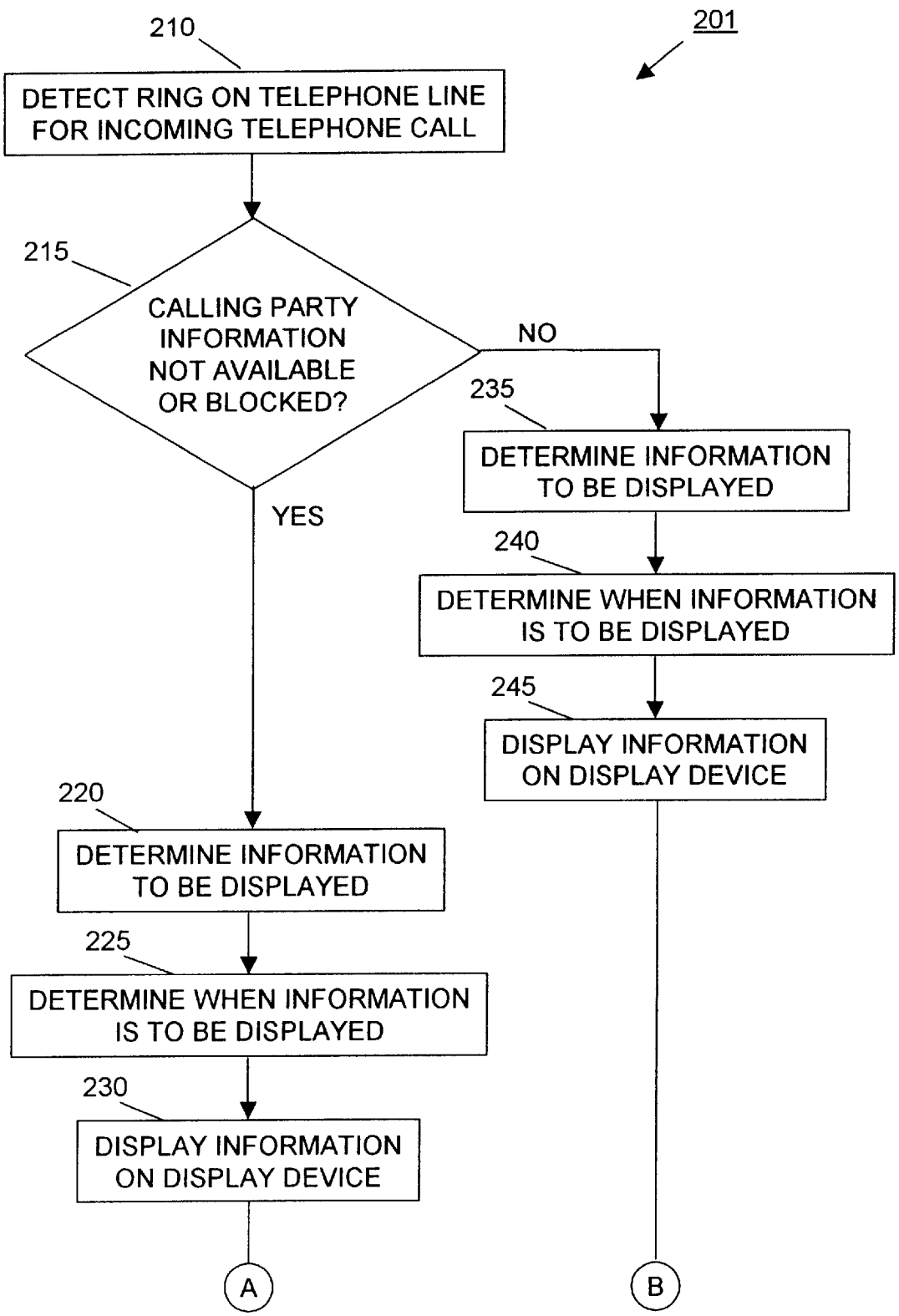
FIGS. 11A and 11B illustrate a flow chart of a process for selectively sending a false SIT in response to an incoming telephone call based on information about the calling party.
Figure 11B:
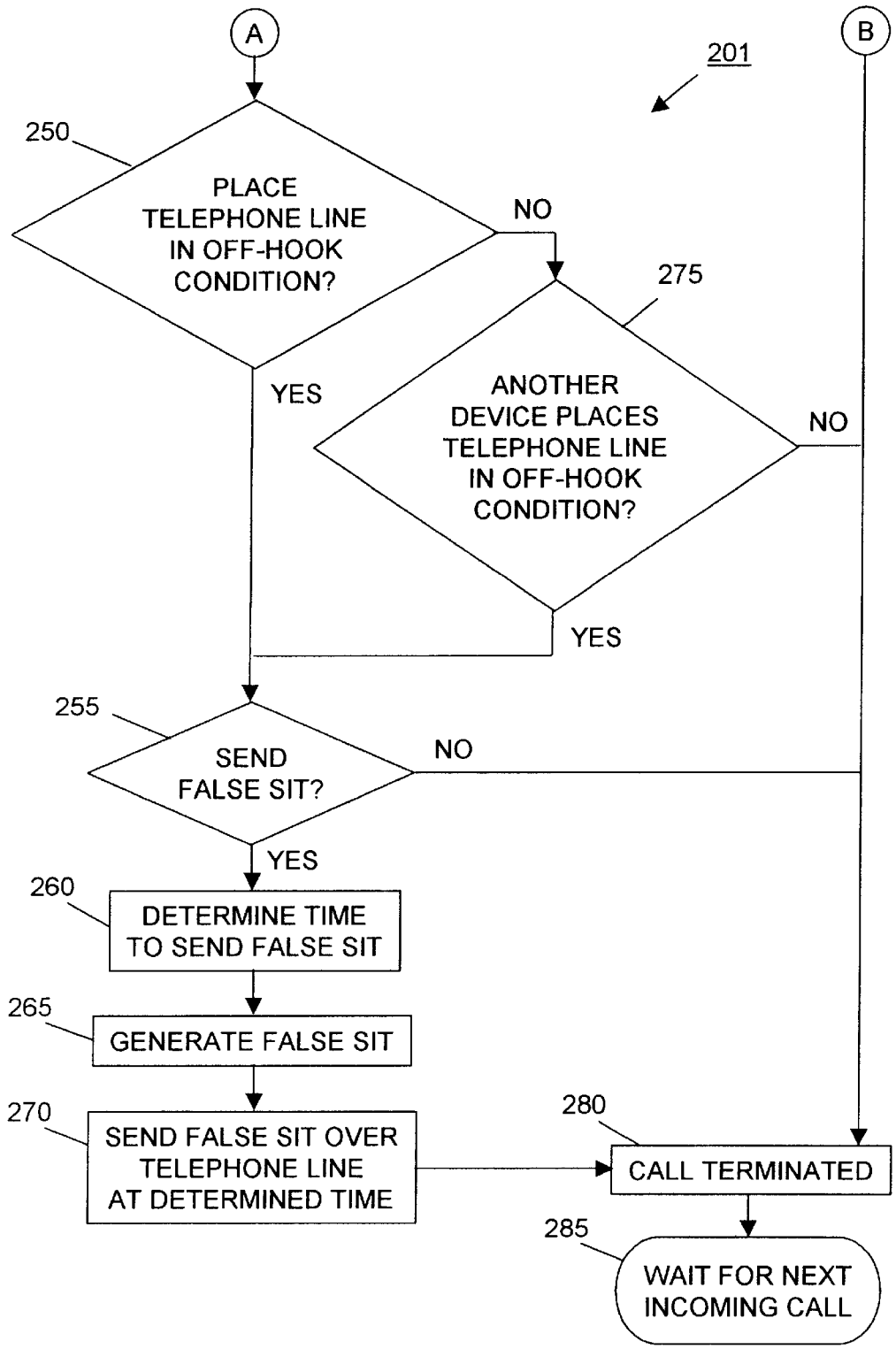

With reference to FIGS. 11A and 11B, a flow chart of a process 201 for selectively sending a false SIT in response to an incoming telephone call based on information about the calling party is provided. The process 201 may be implemented on a telephone call management system 1, 10 as described above in reference to FIGS. 1–10. The selective false SIT process 201 begins when a ring is detected on the telephone line for an incoming telephone call 210. Next, the system determines if calling party information is not available or blocked 215. If calling party information is not available or blocked, the system determines the information to be displayed 220 on the display device, determines when the information is to be displayed 225 on the display device, and displays the determined information on the display device 230. Next, the system determines whether or not to place the telephone line in an off-hook condition 250 for the incoming telephone call. If the system places the telephone line in an off-hook condition, next the system determines whether or not to send a false SIT 255 for the incoming telephone call. If the system determines that it will send a false SIT, next the system determines when to send the false SIT 260. Then, the system generates the false SIT 265 and sends the false SIT over the telephone line at the determined time 270. In this scenario, the call is terminated 280 by the system. With the process complete, the system waits for a next incoming call 285 to start over.

At step 215, if calling party information is available, the system determines the calling party information to be displayed 235 on the display device, determines when the calling party information is to be displayed 240 on the display device, and displays the determined calling party information on the display device 245. In this scenario, the call is terminated 280 by either the calling party or the receiving party. With the process complete, the system waits for a next incoming call 285 to start over.

At step 250, if the system does not place the telephone line in an off-hook condition, the system waits for another device at the receiving end to place the telephone line in an off-hook condition 275. When another device places the telephone line in an off-hook condition, the process continues on to step 255 as described above. Otherwise, if no device places the telephone line in an off-hook condition, the call is terminated 280 by the calling party. With the process complete, the system waits for a next incoming call 285 to start over.

At step 255, if the system determines that it will not send a false SIT, the call is terminated 280 by either the calling party or the receiving party. With the process complete, the system waits for a next incoming call 285 to start over.

Figure 12:
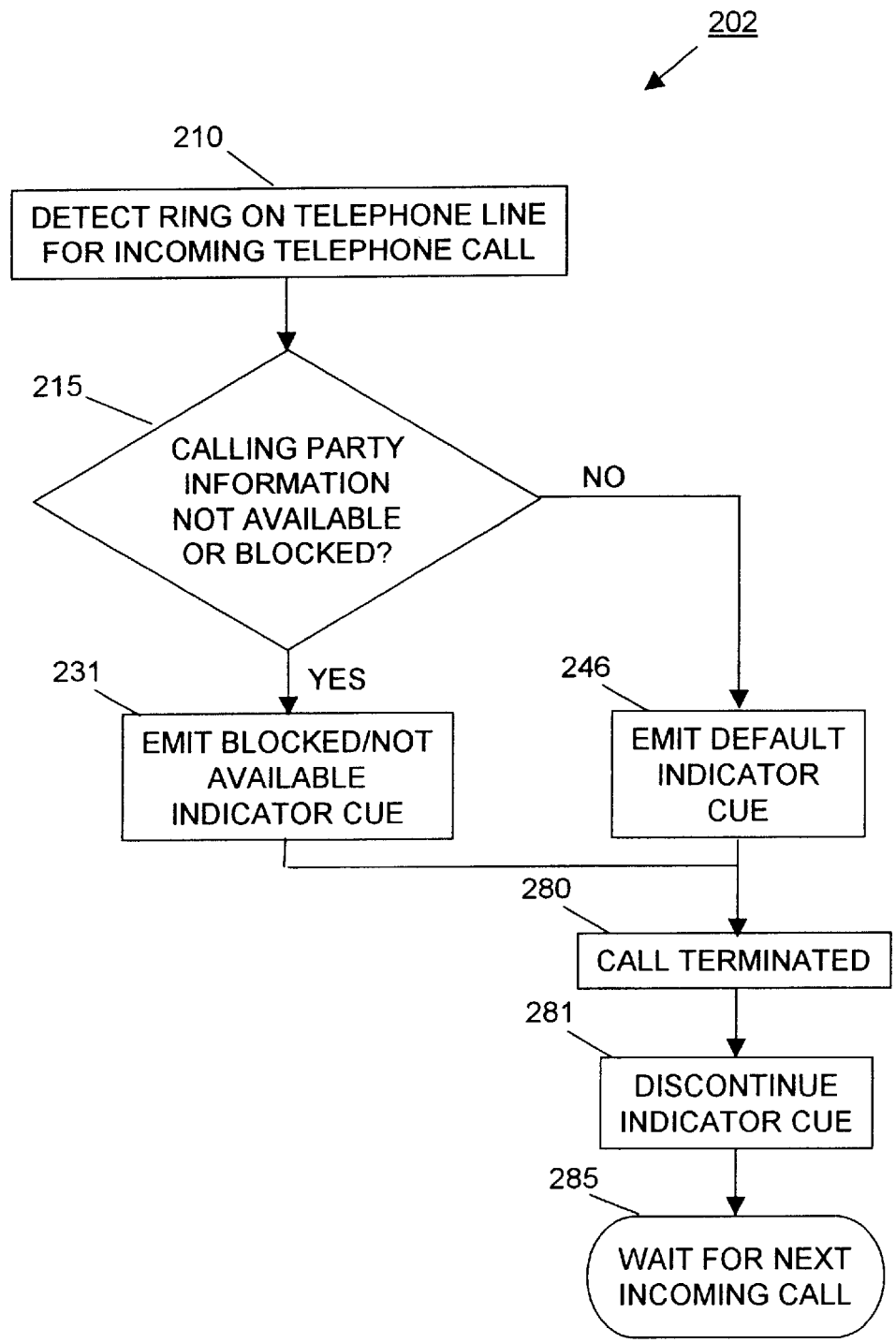
FIG. 12 is a flow chart showing another selective false SIT process that adds visual indicator cues to the process of FIG. 11.

With reference to FIG. 12, a flow chart showing another selective false SIT process 202 that adds indicator cues to the process 201 of FIG. 11 is provided. More specifically, steps 231, 246, and 281 are added and superimposed upon the process 201 of FIG. 11 creating another selective false SIT process 202. If calling party information is not available or blocked at step 215, the system emits a blocked/not available indicator cue 231. Alternatively, if calling party information is available, the system emits a default indicator cue 246. After the call is terminated 280, the system discontinues any indicator cue 281 that had been illuminated.

Figure 13:
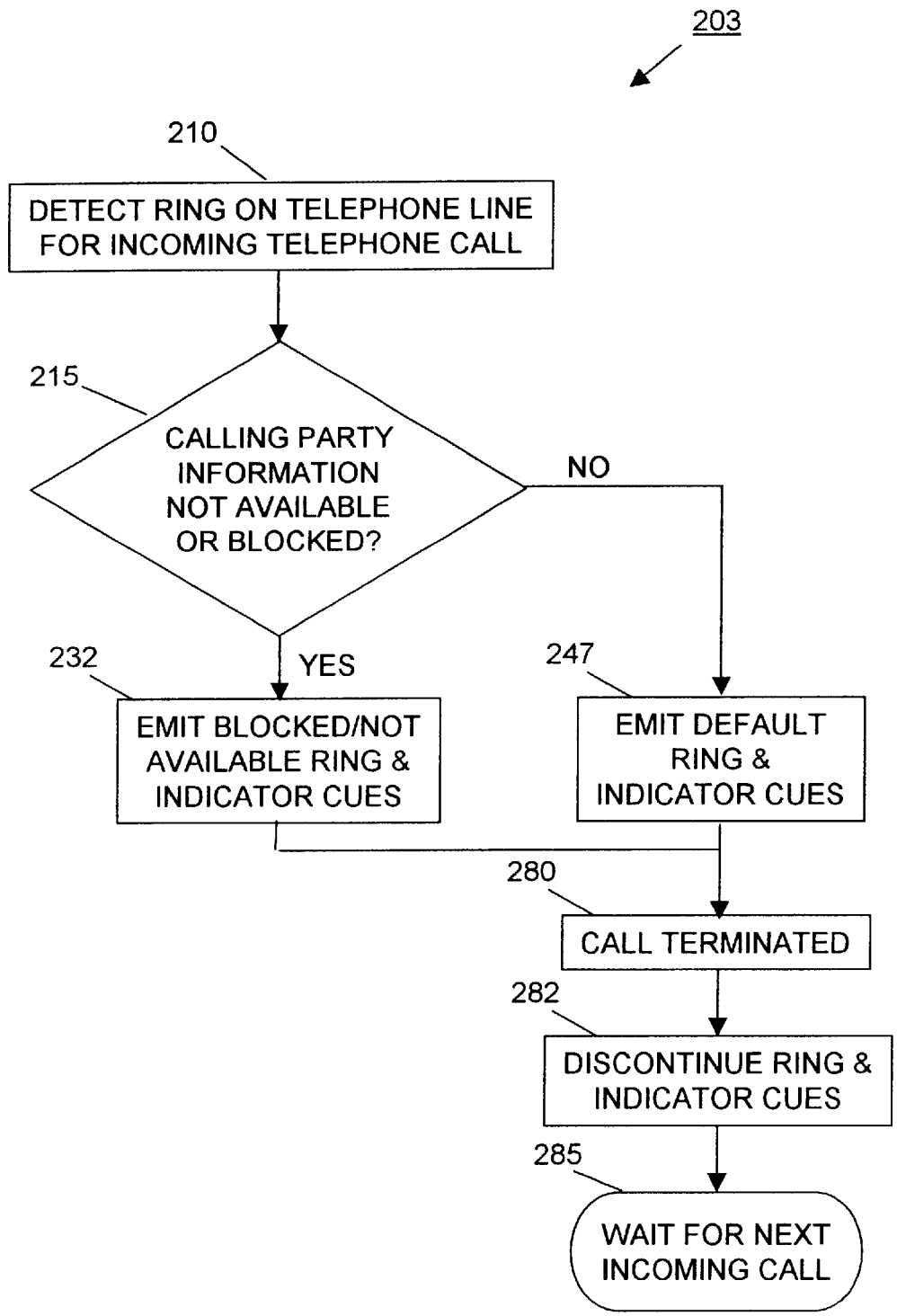
FIG. 13 is a flow chart showing another selective false SIT process that adds audible ringing cues to the process of FIG. 12.

With reference to FIG. 13, a flow chart showing another selective false SIT process 203 that adds audible ringing cues to the process 202 of FIG. 12 is provided. More specifically, steps 232, 247, and 282 replace steps 231, 246, and 281, respectively, in process 202 of FIG. 12, which is superimposed upon the process 201 of FIG. 11, creating still another selective false SIT process 203. If calling party information is not available or blocked at step 215, the system emits a blocked/not available ring cue and a blocked/not available indicator cue 232. Alternatively, if calling party information is available, the system emits a default ring cue and a default indicator cue 247. After the call is terminated 280, the system discontinues any ring and indicator cues 282 that had been sounded and illuminated, respectively.

Figure 14:
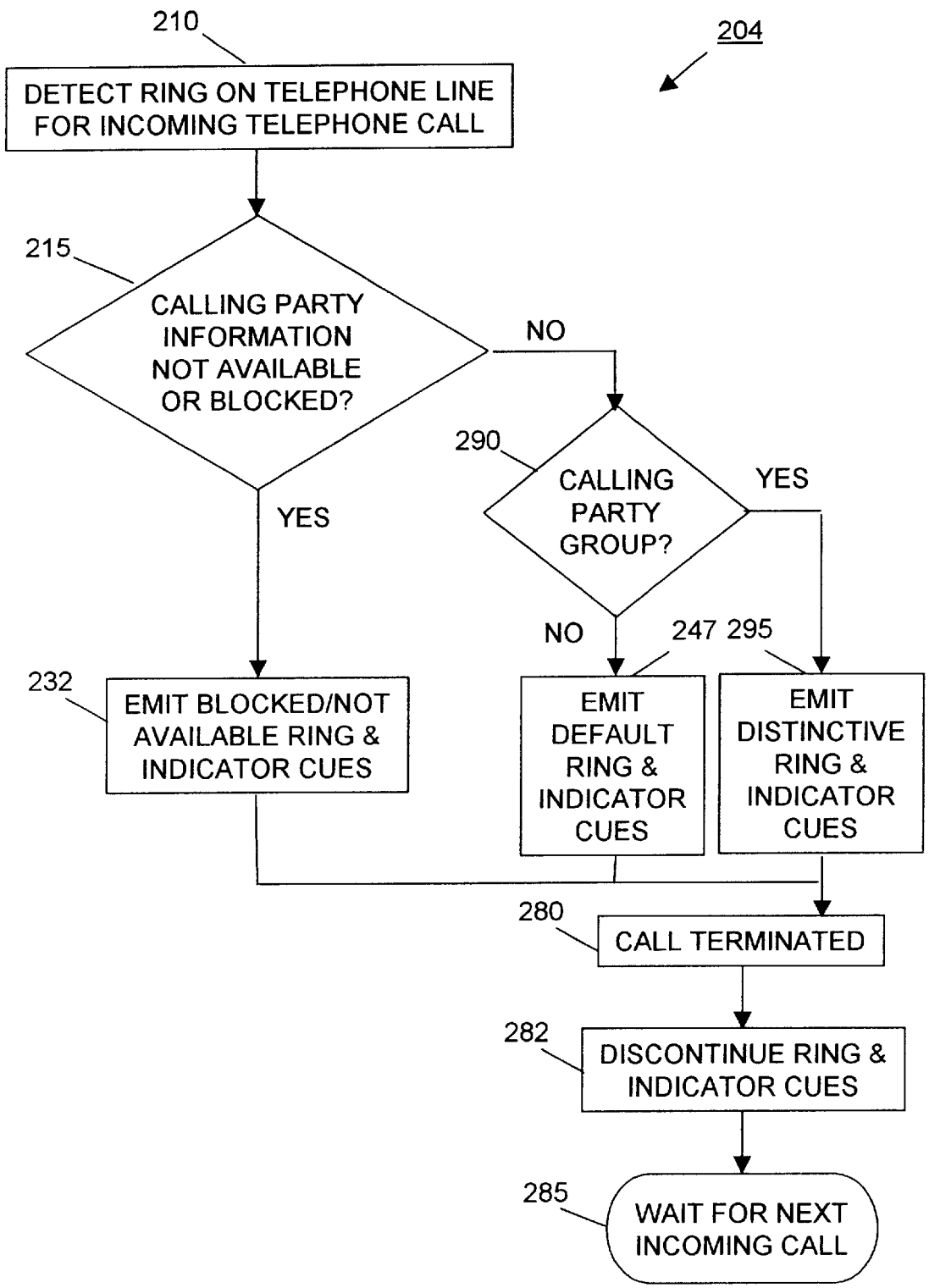
FIG. 14 is a flow chart showing another selective false SIT process that adds calling party groups and distinctive ringing associated with calling party groups to the process of FIG. 13.
Figure 15A:
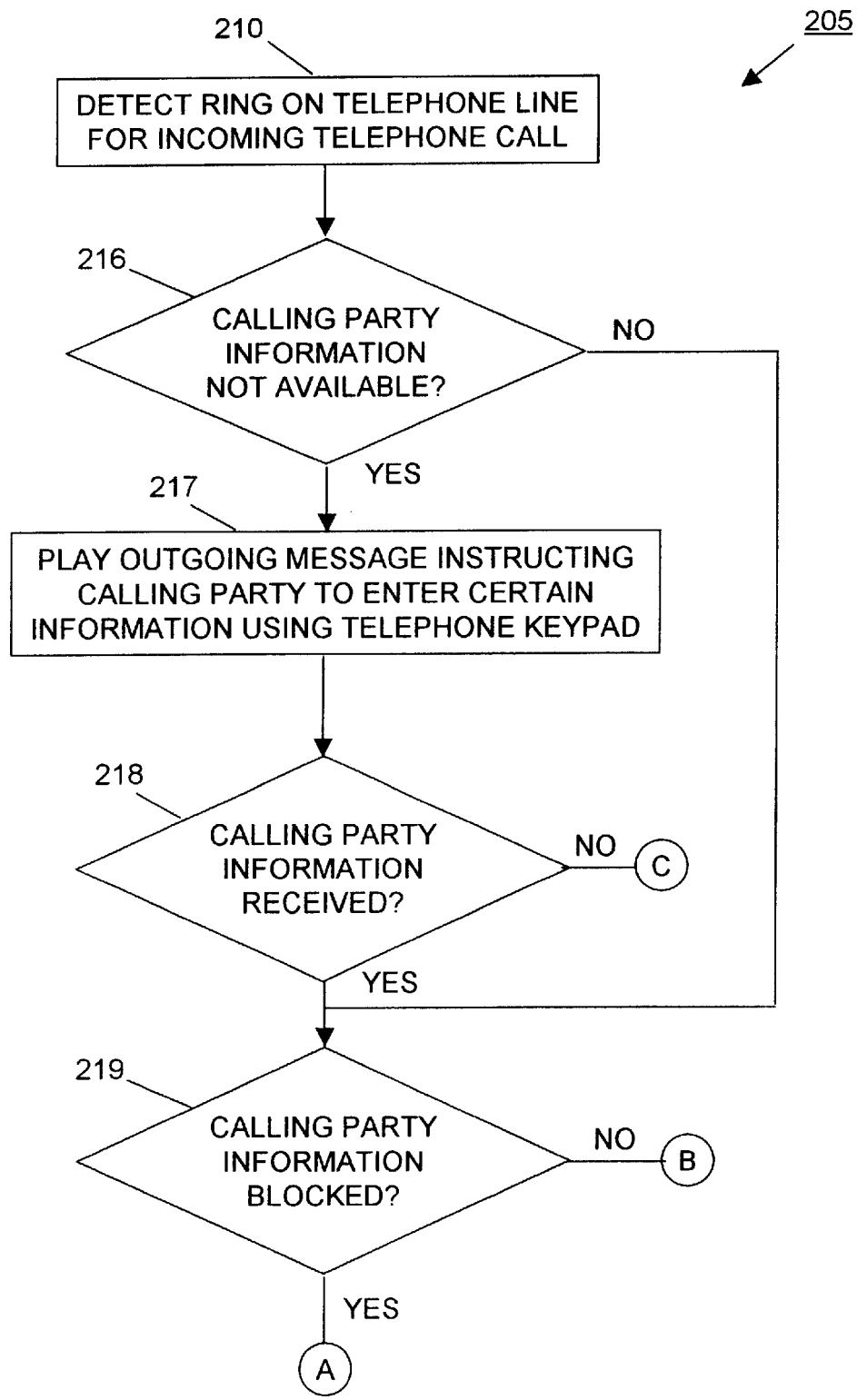
FIGS. 15A–15D illustrate a flow chart of another process for selectively sending a false SIT in response to an incoming telephone call based on information about the calling party.
Figure 15B:
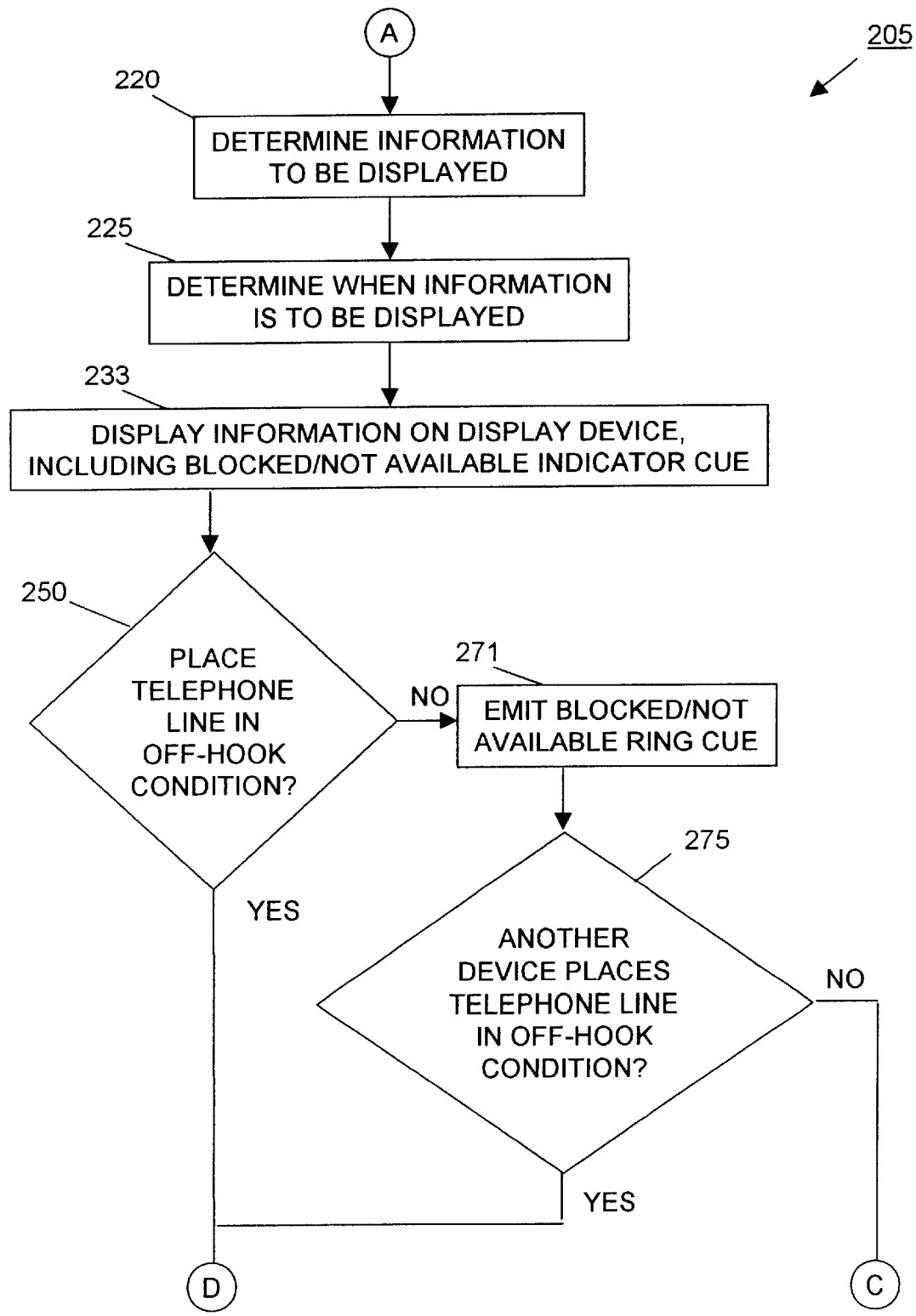
Figure 15C:
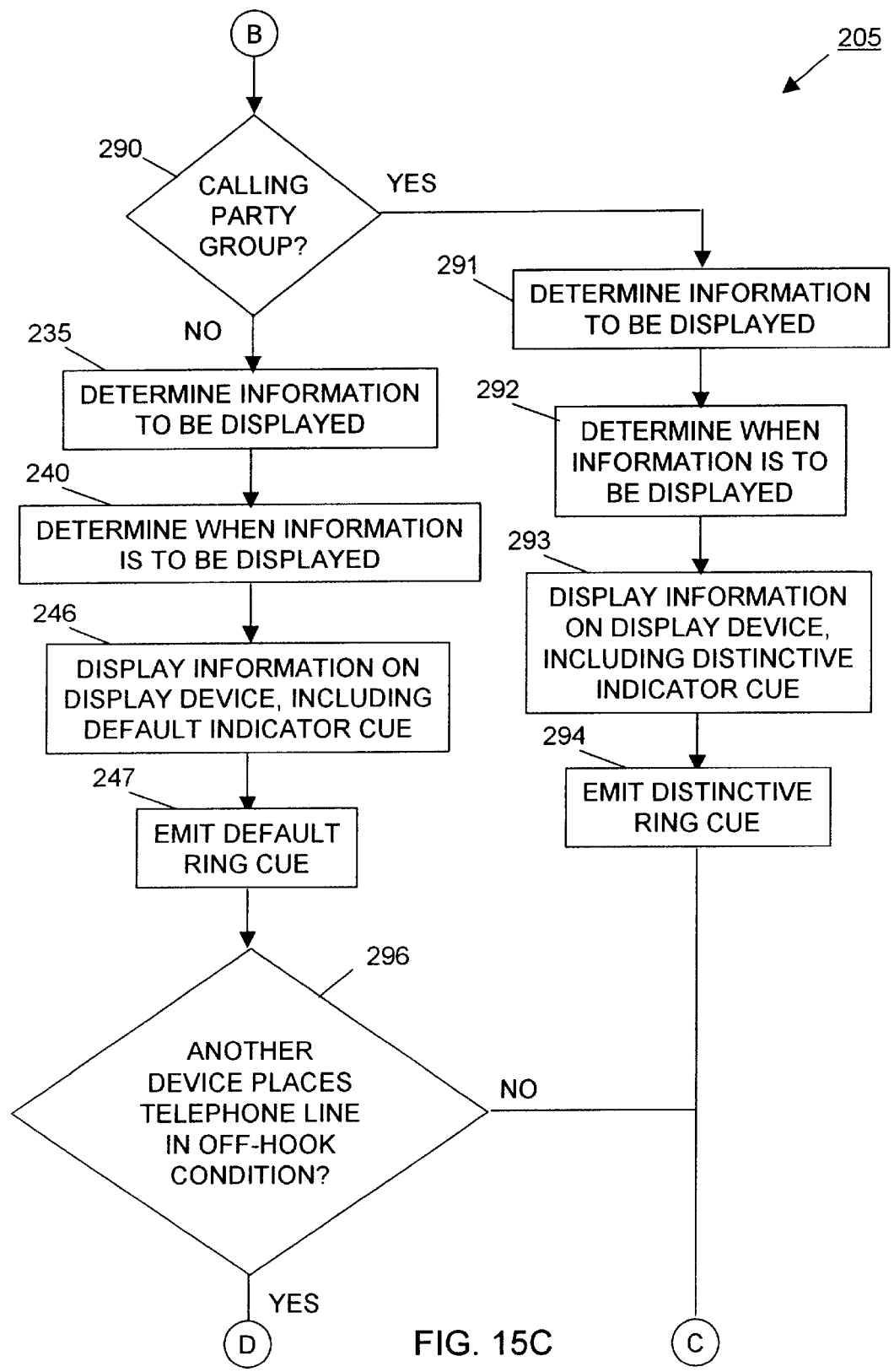
Figure 15D:
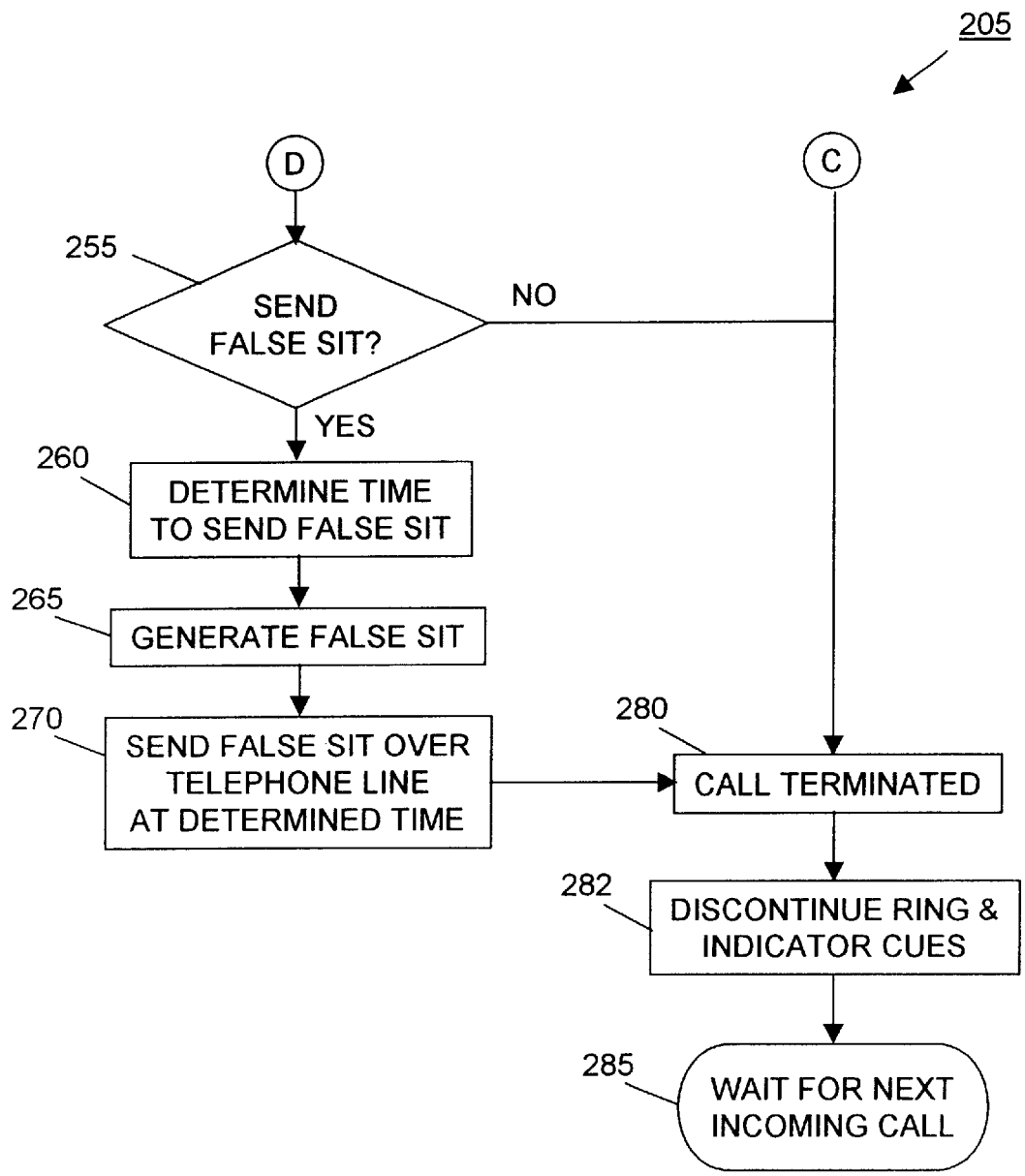

With reference to FIG. 14, a flow chart showing another selective false SIT process 204 that adds calling party groups and distinctive ringing associated with calling party groups to the process 203 of FIG. 13 is provided. More specifically, steps 290 and 295 are added to the process 203 of FIG. 13, which is superimposed upon the process 201 of FIG. 11, creating yet another selective false SIT process 204. If calling party information is available at step 215, the system determines if the calling party information received matches stored information for potential calling parties in a "preferred" calling party group 290. If the calling party information received is associated with a "preferred" calling party group, the system emits a distinctive ring cue and a distinctive indicator cue 295 associated with the "preferred" calling party group. There can be multiple "preferred" calling party groups, as described above in reference to FIGS. 6–10. Furthermore, either distinctive ring cues or distinctive indicator cues can be implemented individually.

With reference to FIGS. 15A–15D, a flow chart showing another process 205 for selectively sending a false SIT in response to an incoming telephone call based on information about the calling party is provided. The process 205 may be implemented on a telephone call management system 10 as described above in reference to FIGS. 7 and 10. The selective false SIT process 205 begins when a ring is detected on the telephone line for an incoming telephone call 210. Next, the system determines if calling party information is not available 216. If calling party information is not available, the system sends an outgoing verbal message instructing the calling party to enter certain information about the calling party (e.g., the calling party's telephone number) using the telephone keypad 217. Next, the system determines if the requested calling party information is received 218. If the calling party information is received, the system 10 determines if calling party information is blocked 219. If calling party information is blocked, the system determines the information to be displayed 220 on the display device, determines when the information is to be displayed 225 on the display device, and displays the determined information on the display device, including a blocked/not available indicator cue 233. Next, the system determines whether or not to place the telephone line in an off-hook condition 250 for the incoming telephone call. If the system places the telephone line in an off-hook condition, next the system determines whether or not to send a false SIT 255 for the incoming telephone call. If the system determines that it will send a false SIT, next the system determines when to send the false SIT 260. Then, the system generates the false SIT 265 and sends the false SIT over the telephone line at the determined time 270. In this scenario, the call is terminated 280 by the system. After the call is terminated 280, the system discontinues any ring and indicator cues 282 that had been sounded and illuminated, respectively. With the process complete, the system waits for a next incoming call 285 to start over.

At step 216, if calling party information is available, the system proceeds to step 219 and continues as described above.

At step 218, if the requested calling party information is not received, the incoming call is terminated 280 by the calling party.

At step 219, if calling party information is not blocked, the system determines if the calling party information received matches stored information for potential calling parties in a "preferred" calling party group 290. If the calling party information received is not associated with a "preferred" calling party group, the system determines the calling party information to be displayed 235 on the display device, determines when the calling party information is to be displayed 240 on the display device, displays the determined calling party information on the display device, including a default indicator cue 246, and emits a default ring cue 247. Next, the system waits for another device at the receiving end to place the telephone line in an off-hook condition 296. When another device places the telephone line in an off-hook condition, the process continues to step 255 and proceeds as described above. Otherwise, if no device places the telephone line in an off-hook condition, the call is terminated 280 by the calling party and proceeds from step 280 as described above.

At step 250, if the system does not place the telephone line in an off-hook condition, the system emits a blocked/not available ring cue 271. Then, the system waits for another device at the receiving end to place the telephone line in an off-hook condition 275. When another device places the telephone line in an off-hook condition, the process continues to step 255 and proceeds as described above. Otherwise, the call is terminated 280 by the calling party and the process continues from step 280 as described above.

At step 290, if the calling party information received is associated with a "preferred" calling party group, the system determines the calling party information to be displayed 291 on the display device, determines when the calling party information is to be displayed 292 on the display device, displays the determined calling party information on the display device, including a distinctive indicator cue 293 associated with the "preferred" calling party group, and emits a distinctive ring cue 294 associated with the "preferred" calling party group. Next, the call is terminated 280 by either the calling party or the receiving party and the process continues from step 280 as described above. There can be multiple "preferred" calling party groups, as described above in reference to FIGS. 6–10. Furthermore, either distinctive ring cues or distinctive indicator cues can be implemented individually.

Figure 16:
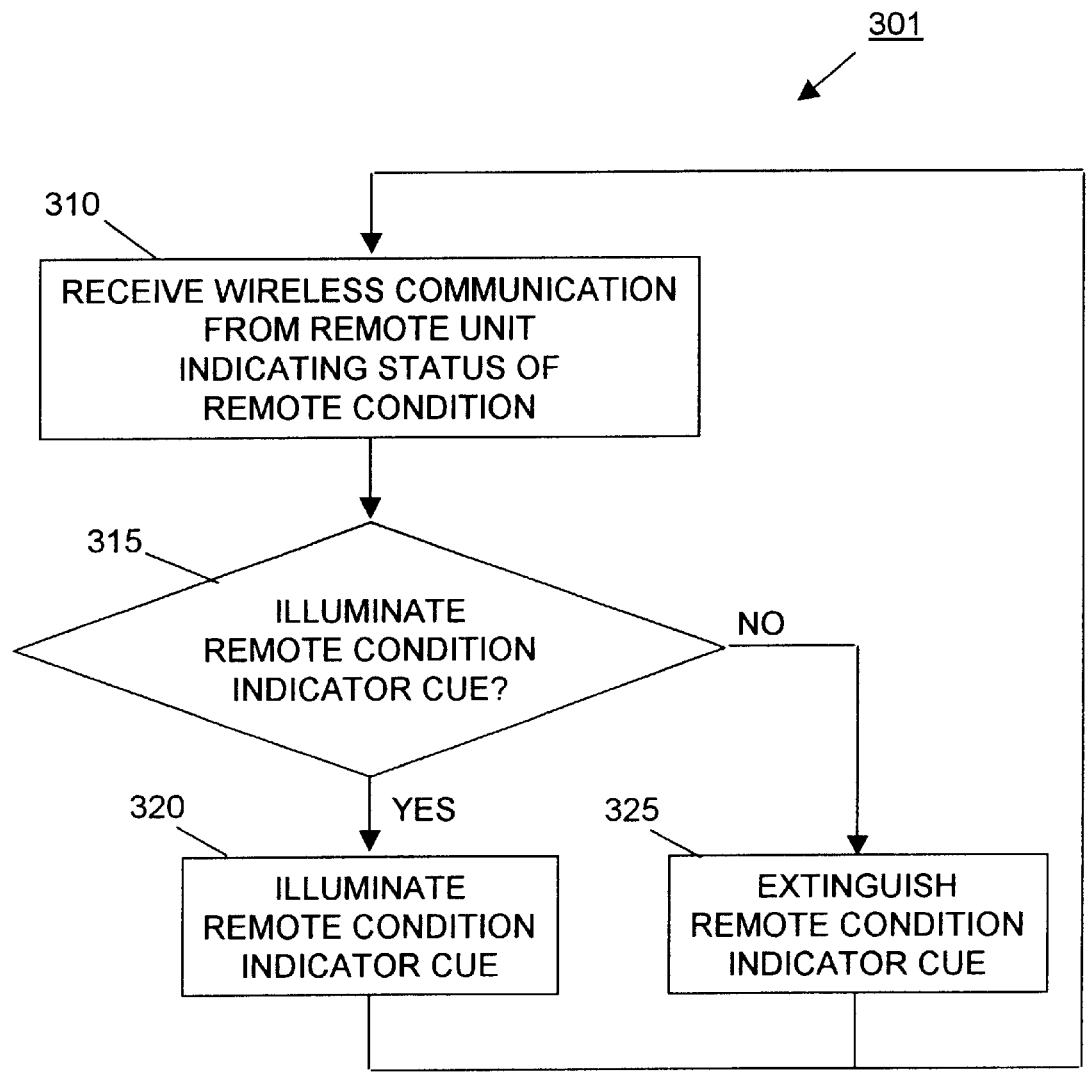
FIG. 16 is a flow chart showing a process for controlling a remote condition indicator cue.

With reference to FIG. 16, a flow chart showing a process 301 for controlling a remote condition indicator cue is provided. The process 301 may be implemented in combination with any of the processes (201–205) of FIGS. 11–15. The process 301 is performed repetitively (i.e., periodically) and in parallel to the selective false SIT process (201–205) of FIGS. 11–15. The process 301 begins when the system receives a wireless communication from a remote unit indicating the status of a remote condition 310. Based on the status of the remote condition, the system determines whether or not to illuminate the remote condition indicator cue 315. Depending on the result of this determination, the system illuminates the remote condition indicator cue 320 or extinguishes the remote condition indicator cue 325. The process 301 continues by returning to step 310.

While the invention is described herein in conjunction with exemplary embodiments, it is evident that many alternatives, modifications, and variations will be apparent to those skilled in the art. Accordingly, the embodiments of the invention in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof.

What is claimed is:

1. An apparatus in communication with a telephone line, comprising:
   a base unit, the base unit further comprising:
   a telephone line interface module operatively coupled to the telephone line;
   a caller identification (caller ID) module in communication with the telephone line interface module and receiving information over the telephone line about a calling party associated with an incoming telephone call;
   a programmable oscillator module in communication with the telephone line interface module for selectively generating a false special information tone (SIT) substantially similar to at least a first part of a SIT;
   a first display device; and,
   a first controller in communication with the telephone line interface module, the caller ID module, the programmable oscillator module, and the first display device: i) for determining whether the false SIT is to be generated based at least in part on information received about the calling party and ii) if the false SIT is to be generated, a) for determining when the false SIT is to be generated, b) for controlling the programmable oscillator to selectively generate the false SIT, and c) for controlling the telephone line interface module to automatically send the false SIT over the telephone line at the determined time in response to the incoming telephone call after the telephone line is placed in an off-hook condition.

2. The apparatus according to claim 1, the base unit further comprising:
   a power distribution module for distributing electrical power to the caller ID module, the programmable oscillator module, the first display device, and the first controller, wherein the power distribution module is adapted to receive power from a battery.

3. The apparatus according to claim 1, the base unit further comprising:
   one or more control devices in communication with the first controller.

4. The apparatus according to claim 1, the base unit further comprising:
   a transmitter in communication with the first controller; and,
   the apparatus further comprising:
   one or more wireless display remote units operatively coupled to the transmitter.

5. The apparatus according to claim 4, each display remote unit further comprising:
   a receiver operatively coupled to the base unit when the remote unit is within communicative range of the base unit;
   a second display device; and,
   a second controller in communication with the receiver and the second display device.

6. The apparatus according to claim 5, each remote unit further comprising:
one or more control devices in communication with the second controller.

7. The apparatus according to claim 1, the apparatus further comprising:
one or more wireless monitoring remote units operatively coupled to the base unit; and,
the base unit further comprising:
a receiver in communication with the first controller and operatively coupled to the one or more monitoring remote units when the remote unit is within communicative range of the base unit.

8. An apparatus in communication with a telephone line, comprising:
a base unit, the base unit further comprising:
a data storage module for storing information about one or more potential calling parties associated with potential incoming telephone calls on the telephone line;
a telephone line interface module operatively coupled to the telephone line;
a caller identification (caller ID) module in communication with the telephone line interface module and receiving information over the telephone line about a first calling party associated with a first incoming telephone call;
a first programmable oscillator module in communication with the telephone line interface module for selectively generating a false special information tone (SIT) substantially similar to at least a first part of a SIT;
a first display device;
a first controller in communication with the telephone line interface module, the caller ID module, the programmable oscillator module, and the first display device: i) for determining whether the false SIT is to be generated based at least in part on information received about the calling party and ii) if the false SIT is to be generated, a) for determining when the false SIT is to be generated, b) for controlling the programmable oscillator to selectively generate the false SIT, and c) for controlling the telephone line interface module to automatically send the false SIT over the telephone line at the determined time in response to the first incoming telephone call after the telephone line is placed in an off-hook condition; and,
one or more control devices in communication with the first controller.

9. The apparatus according to claim 8, the first display device further comprising:
a multiple character display in communication with the first controller.

10. The apparatus according to claim 8, the base unit further comprising:
a speaker module;
an audio switch electrically positioned between the telephone line interface module and the first programmable oscillator and in communication with the speaker module and the first controller for selectively switching the audio signal from the first programmable oscillator to the telephone line interface module or to the speaker module;
the audio signal generated by the first programmable oscillator further comprising:
a telephone ringing tone, wherein when the first programmable oscillator is switched to the telephone line interface module the audio signal comprises the false SIT and when the first programmable oscillator is switched to the speaker module the audio signal comprises the telephone ringing tone; and,
wherein the first controller is also: i) for determining if the telephone ringing tone is to be generated, ii) if the telephone ringing tone is to be generated, a) for controlling the programmable oscillator to generate the telephone ringing tone and b) for controlling the audio switch to communicate the telephone ringing tone to the speaker module, and iii) for controlling the audio switch to route the false SIT to the telephone line via the telephone line interface at the determined time when the false SIT should be sent on the telephone line.

11. The apparatus according to claim 8, the base unit further comprising:
a transmitter in communication with the first controller; and,
the apparatus further comprising:
one or more wireless display remote units operatively coupled to the transmitter when the remote unit is within communicative range of the base unit.

12. The apparatus according to claim 11, each remote unit further comprising:
a receiver operatively coupled to the base unit when the remote unit is within communicative range of the base unit;
a speaker module;
a second programmable oscillator in communication with the speaker module;
a second controller in communication with the receiver and the second programmable oscillator: i) for determining if a telephone ringing tone is to be generated and ii) if the telephone ringing tone is to be generated, for controlling the second programmable oscillator to generate the telephone ringing tone.

13. A method for selectively sending a false special information tone (SIT) on a telephone line in response to an incoming telephone call, comprising the steps of:
a) detecting a ring on the telephone line for an incoming telephone call;
b) receiving information over the telephone line about a calling party associated with the incoming telephone call;
c) determining if a false SIT is to be sent over the telephone line based at least in part on the information received about the calling party; and,
d) if it is determined that the false SIT is to be sent:
i) determining when the false SIT is to be sent over the telephone line;
ii) generating the false SIT; and,
iii) automatically sending the false SIT over the telephone line at the determined time in response to the incoming telephone call after the telephone line is placed in an off-hook condition.

14. The method according to claim 13, wherein step c) further comprises the steps of:
e) determining if information about the calling party is not available;
f) if information about the calling party is not available, determining that a false SIT is to be sent in response to the incoming telephone call;

g) if information about the calling party is available, determining if the information about the calling party associated with the incoming telephone call matches information about any potential calling party within a group of potential calling parties which have been blocked from calling; and, h) if the calling party is blocked, determining that a false SIT is to be sent in response to the incoming telephone call, otherwise, determining that a false SIT is not to be sent.

15. The method according to claim 13, further comprising the following steps during step d) before sub-step d) iii):

e) illuminating a blocked/not available indicator cue; and, f) extinguishing the blocked/not available indicator cue after the telephone line is placed in an off-hook condition.

16. The method according to claim 13, further comprising the following steps if it is determined that the false SIT is not to be sent during step c):

e) illuminating a default indicator cue; and, f) extinguishing the default indicator cue after the telephone line is placed in an off-hook condition.

17. The method according to claim 13, further comprising the following steps during step d) before sub-step d) iii):

e) annunciating a distinctive blocked/not available audible ring cue during times when a telephone ring is detected on the telephone line for the incoming telephone call; and, f) discontinuing annunciation of the distinctive blocked/not available ring cue after the telephone line is placed in an off-hook condition.

18. The method according to claim 13, further comprising the following steps if it is determined that the false SIT is not to be sent during step c):

e) annunciating a default audible ring cue during times when a telephone ring is detected on the telephone line for the incoming telephone call; and, f) discontinuing annunciation of the default ring cue after the telephone line is placed in an off-hook condition.

19. The method according to claim 13, further comprising the following steps if it is determined that the false SIT is not to be sent during step c):

e) determining if the information about the calling party associated with the incoming telephone call matches information about a potential calling party in a first group of potential calling parties which have been associated with a first distinctive ring cue;

f) if the information matches information about a potential calling party in the first group, annunciating a first distinctive audible ring cue during times when a telephone ring is detected on the telephone line for the incoming telephone call;

g) if the information does not match information about a potential calling party in any group, annunciating a default audible ring cue during times when a telephone ring is detected on the telephone line for the incoming telephone call; and, h) discontinuing annunciation of any ring cue after the telephone line is placed in an off-hook condition.

20. The method according to claim 19, further comprising the following steps after step e) if it is determined that the information about the calling party associated with the incoming telephone call does not match information about a potential calling party in the first group of potential calling parties:

i) determining if the information about the calling party associated with the incoming telephone call matches information about a potential calling party in a second group of potential calling parties which have been associated with a second distinctive ring; and, j) if the information matches information about a potential calling party in the second group, annunciating a second distinctive audible ring cue during times when a telephone ring is detected on the telephone line for the incoming telephone call.

21. The method according to claim 13, further comprising the following steps if it is determined that the false SIT is not to be sent during step c):

e) determining if the information about the calling party associated with the incoming telephone call matches information about a potential calling party in a first group of potential calling parties which have been associated with a first distinctive indicator cue;

f) if the information matches information about a potential calling party in the first group, illuminating a first distinctive indicator cue;

g) if the information does not match information about a potential calling party in any group, illuminating a default indicator cue; and, h) extinguishing any distinctive or default indicator cue associated with the incoming telephone call after the telephone line is placed in an off-hook condition.

22. The method according to claim 21, further comprising the following steps after step e) if it is determined that the information about the calling party associated with the incoming telephone call does not match information about a potential calling party in the first group of potential calling parties:

i) determining if the information about the calling party associated with the incoming telephone call matches information about a potential calling party in a second group of potential calling parties which have been associated with a second distinctive indicator cue; and, j) if the information matches information about a potential calling party in the second group, illuminating a second distinctive indicator cue.

23. The method according to claim 13, wherein the first set of previously determined rules in step c) comprises the steps of:

e) determining if information about the calling party is not available;

f) if information about the calling party is not available, playing an outgoing message instructing the calling party to enter certain information using the telephone keypad, otherwise proceeding to step h);

g) receiving information entered by the calling party over the telephone line associated with the calling party for the incoming telephone call;

h) determining if the information about the calling party associated with the incoming telephone call matches information about any potential calling party within a group of potential calling parties which have been blocked from calling; and, i) if the calling party is blocked, determining that a false SIT is to be sent in response to the incoming telephone call, otherwise, determining that a false SIT is not to be sent.

24. The method according to claim 13, further comprising the following steps:

e) receiving a wireless communication from a wireless remote unit monitoring a remote condition, wherein the wireless communication indicates a status of the remote condition;

f) determining if a remote condition indicator cue should be illuminated based on the status of the remote condition;

g) if the remote condition indicator cue should be illuminated, illuminating the remote condition indicator, otherwise extinguishing the remote condition indicator cue; and, h) repeating steps e) through g).

25. The method according to claim 13, wherein step c) further comprises the steps of:

e) determining if information about the calling party is not available; and f) if information about the calling party is not available, determining that a false SIT is to be sent in response to the incoming telephone call.

26. The method according to claim 13, wherein step c) further comprises the steps of:

e) determining if the information about the calling party associated with the incoming telephone call matches information about any potential calling party within a group of potential calling parties which have been blocked from calling; and, f) if the calling party is blocked, determining that a false SIT is to be sent in response to the incoming telephone call, otherwise, determining that a false SIT is not to be sent.

27. The method according to claim 13, further comprising the following steps:

e) receiving a wireless communication from a wireless remote unit monitoring a remote condition, wherein the wireless communication indicates a status of the remote condition;

f) determining if a remote condition indicator cue should be illuminated based on the status of the remote condition; and g) if the remote condition indicator cue should be illuminated, illuminating the remote condition indicator, otherwise extinguishing the remote condition indicator cue.

28. An apparatus in communication with a telephone line, comprising:

a base unit, the base unit further comprising:

a telephone line interface module operatively coupled to the telephone line;

a caller identification (caller ID) module in communication with the telephone line interface module and receiving information over the telephone line about a calling party associated with an incoming telephone call;

a programmable oscillator module in communication with the telephone line interface module for selectively generating a false special information tone (SIT) substantially similar to at least a first part of a SIT; and a first controller in communication with the telephone line interface module, the caller ID module, and the programmable oscillator module: i) for determining whether the false SIT is to be generated based at least in part on information received about the calling party and ii) if the false SIT is to be generated, a) for determining when the false SIT is to be generated, b) for controlling the programmable oscillator to selectively generate the false SIT, and c) for controlling the telephone line interface module to automatically send the false SIT over the telephone line at the determined time in response to the incoming telephone call after the telephone line is placed in an off-hook condition.

29. An apparatus in communication with a telephone line, comprising:

a base unit, the base unit further comprising:

a data storage module for storing information about one or more potential calling parties associated with potential incoming telephone calls on the telephone line;

a telephone line interface module operatively coupled to the telephone line;

a caller identification (caller ID) module in communication with the telephone line interface module and receiving information over the telephone line about a first calling party associated with a first incoming telephone call;

a first programmable oscillator module in communication with the telephone line interface module for selectively generating a false special information tone (SIT) substantially similar to at least a first part of a SIT; and a first controller in communication with the telephone line interface module, the caller ID module, and the programmable oscillator module: i) for determining whether the false SIT is to be generated based at least in part on information received about the calling party and ii) if the false SIT is to be generated, a) for determining when the false SIT is to be generated, b) for controlling the programmable oscillator to selectively generate the false SIT, and c) for controlling the telephone line interface module to automatically send the false SIT over the telephone line at the determined time in response to the first incoming telephone call after the telephone line is placed in an off-hook condition.

30. A method for selectively sending a false special information tone (SIT) on a telephone line in response to an incoming telephone call, comprising the steps of:

a) receiving information over the telephone line about a calling party associated with an incoming telephone call;

b) determining if a false SIT is to be sent over the telephone line based at least in part on the information received about the calling party; and, c) if it is determined that the false SIT is to be sent:
   i) determining when the false SIT is to be sent over the telephone line;
   ii) generating the false SIT; and,
   iii) automatically sending the false SIT over the telephone line at the determined time in response to the incoming telephone call after the telephone line is placed in an off-hook condition.

* * * * *